US008170884B2

(12) United States Patent
Vaudrey et al.

(10) Patent No.: US 8,170,884 B2
(45) Date of Patent: *May 1, 2012

(54) USE OF VOICE-TO-REMAINING AUDIO (VRA) IN CONSUMER APPLICATIONS

(75) Inventors: Michael A. Vaudrey, Blacksburg, VA (US); William R. Saunders, Blacksburg, VA (US)

(73) Assignee: Akiba Electronics Institute LLC, Wilmington, DE (US)

( * ) Notice: Subject to any disclaimer, the term of this patent is extended or adjusted under 35 U.S.C. 154(b) by 1150 days.

This patent is subject to a terminal disclaimer.

(21) Appl. No.: 11/971,183

(22) Filed: Jan. 8, 2008

(65) Prior Publication Data

US 2008/0130924 A1 Jun. 5, 2008

Related U.S. Application Data

(60) Continuation of application No. 11/154,816, filed on Jun. 17, 2005, now Pat. No. 7,337,111, which is a division of application No. 09/934,541, filed on Aug. 23, 2001, now Pat. No. 6,912,501, which is a continuation of application No. 09/580,206, filed on May 26, 2000, now Pat. No. 6,311,155, said application No. 11/154,816 is a continuation-in-part of application No. 09/673,275, filed as application No. PCT/US99/08055 on Apr. 14, 1999, now Pat. No. 7,415,120, which is a continuation-in-part of application No. 09/059,303, filed on Apr. 14, 1998, now abandoned, and a continuation-in-part of application No. 09/059,304, filed on Apr. 14, 1998, now abandoned, and a continuation-in-part of application No. 09/059,307, filed on Apr. 14, 1998, now abandoned.

(60) Provisional application No. 60/109,506, filed on Nov. 23, 1998, provisional application No. 60/180,220, filed on Feb. 4, 2000.

(51) Int. Cl.
*G10L 19/00* (2006.01)
(52) U.S. Cl. .......................................... 704/500; 381/10
(58) Field of Classification Search .................. 704/500; 381/10
See application file for complete search history.

(56) References Cited

U.S. PATENT DOCUMENTS 2,783,677 A 3/1957 Becker
(Continued)

FOREIGN PATENT DOCUMENTS
JP 5342762 12/1993
(Continued)

OTHER PUBLICATIONS

ATSC Digital Television Standard, ATSC, Sep. 16, 1995, Annex B. Available online at www.atsc.org/Standards/A53.

(Continued)

*Primary Examiner* — Daniel D Abebe
(74) *Attorney, Agent, or Firm* — Perkins Coie LLP

(57) ABSTRACT

Systems provide an audio/visual output to each of a plurality of listeners in a manner that permits individualized audio adjustment, wherein audio comprises a first signal that is substantially voice and a second signal that is substantially other than voice. The systems may include a video device, a storage medium, and a transmitter that transmits the first and second signals to a plurality of personal listening devices. Each of the plurality of personal listening devices may include first and second receivers, first and second adjustment devices, an audio signal combining device, and one or more transducers, wherein the systems permit each of the plurality of listeners to adjust the first and second signals independently of other ones of the plurality of listeners in an audience.

17 Claims, 27 Drawing Sheets

U.S. PATENT DOCUMENTS

| | | | |
|---|---|---|---|
| 3,046,337 A | | 7/1962 | Hornyak |
| 3,110,769 A | | 11/1963 | Bertram |
| 3,583,803 A | | 6/1971 | Cole |
| 4,024,344 A | | 5/1977 | Dolby et al. |
| 4,051,331 A | | 9/1977 | Strong et al. |
| 4,052,559 A | | 10/1977 | Paul et al. |
| 4,064,364 A | * | 12/1977 | Veale .............................. 369/4 |
| 4,074,084 A | | 2/1978 | Van Den Berg et al. |
| 4,150,253 A | | 4/1979 | Knoppel |
| 4,256,389 A | | 3/1981 | Engebretson |
| 4,405,831 A | | 9/1983 | Michelson |
| 4,406,001 A | | 9/1983 | Klasco et al. |
| 4,454,609 A | | 6/1984 | Kates |
| 4,484,345 A | | 11/1984 | Stearns |
| 4,516,257 A | | 5/1985 | Torick |
| 4,622,440 A | | 11/1986 | Slavin |
| 4,631,525 A | | 12/1986 | Serravalle, Jr. |
| 4,647,980 A | | 3/1987 | Steventon et al. |
| 4,776,016 A | | 10/1988 | Hansen |
| 4,799,260 A | | 1/1989 | Mandell et al. |
| 4,809,337 A | | 2/1989 | Scholz et al. |
| 4,816,905 A | | 3/1989 | Tweedy et al. |
| 4,866,515 A | | 9/1989 | Tagawa et al. |
| 4,868,881 A | | 9/1989 | Zwicker et al. |
| 4,890,170 A | | 12/1989 | Inohana et al. |
| 4,920,570 A | | 4/1990 | West et al. |
| 4,941,177 A | | 7/1990 | Mandell et al. |
| 4,941,179 A | | 7/1990 | Bergenstoff et al. |
| 5,003,605 A | | 3/1991 | Phillipps et al. |
| 5,033,036 A | | 7/1991 | Ohmori et al. |
| 5,113,447 A | | 5/1992 | Hatley et al. |
| 5,131,311 A | | 7/1992 | Murakami et al. |
| 5,138,498 A | | 8/1992 | Takigami et al. |
| 5,144,454 A | | 9/1992 | Cury |
| 5,146,504 A | | 9/1992 | Pinckley |
| 5,155,510 A | | 10/1992 | Beard |
| 5,155,770 A | | 10/1992 | Maejima |
| 5,197,100 A | | 3/1993 | Shiraki et al. |
| 5,210,366 A | | 5/1993 | Sykes, Jr. |
| 5,212,764 A | | 5/1993 | Ariyoshi et al. |
| 5,216,718 A | | 6/1993 | Fukuda et al. |
| 5,228,088 A | | 7/1993 | Kane et al. |
| 5,285,503 A | | 2/1994 | Satoh et al. |
| 5,289,272 A | | 2/1994 | Rabowsky et al. |
| 5,294,746 A | | 3/1994 | Tsumura et al. |
| 5,297,209 A | | 3/1994 | Kowaki et al. |
| 5,319,713 A | | 6/1994 | Waller, Jr. et al. |
| 5,323,467 A | | 6/1994 | Hermes et al. |
| 5,341,253 A | | 8/1994 | Liao et al. |
| 5,384,599 A | | 1/1995 | Casavant et al. |
| 5,395,123 A | | 3/1995 | Kondo et al. |
| 5,396,560 A | | 3/1995 | Arcos et al. |
| 5,400,409 A | | 3/1995 | Linhard et al. |
| 5,408,686 A | | 4/1995 | Mankovitz |
| 5,434,922 A | | 7/1995 | Miller et al. |
| 5,450,146 A | | 9/1995 | Chedeville et al. |
| 5,466,883 A | | 11/1995 | Miyashita et al. |
| 5,469,370 A | | 11/1995 | Ostrover et al. |
| 5,485,522 A | | 1/1996 | Solve et al. |
| 5,530,760 A | | 6/1996 | Paisley et al. |
| 5,541,999 A | | 7/1996 | Hirai et al. |
| 5,564,001 A | | 10/1996 | Lewis |
| 5,569,038 A | | 10/1996 | Tubman et al. |
| 5,569,869 A | | 10/1996 | Sone et al. |
| 5,572,591 A | | 11/1996 | Numazu et al. |
| 5,576,843 A | | 11/1996 | Cookson et al. |
| 5,617,331 A | | 4/1997 | Wakai et al. |
| 5,619,383 A | | 4/1997 | Ngai |
| 5,621,182 A | | 4/1997 | Matsumoto et al. |
| 5,621,850 A | | 4/1997 | Kane et al. |
| 5,631,712 A | | 5/1997 | Suh et al. |
| 5,644,677 A | | 7/1997 | Park et al. |
| 5,666,350 A | | 9/1997 | Huang et al. |
| 5,668,339 A | | 9/1997 | Shin et al. |
| 5,671,320 A | | 9/1997 | Cookson et al. |
| 5,680,465 A | | 10/1997 | Boyden |
| 5,684,714 A | | 11/1997 | Yogeshwar et al. |
| 5,698,804 A | | 12/1997 | Mizuno et al. |
| 5,703,308 A | | 12/1997 | Tashiro et al. |
| 5,706,145 A | | 1/1998 | Hindman et al. |
| 5,712,950 A | | 1/1998 | Cookson et al. |
| 5,717,763 A | | 2/1998 | Choi et al. |
| 5,727,068 A | | 3/1998 | Karagosian et al. |
| 5,732,390 A | | 3/1998 | Katayanagi et al. |
| 5,751,903 A | | 5/1998 | Swaminathan et al. |
| 5,808,569 A | | 9/1998 | Wuppermann et al. |
| 5,809,472 A | | 9/1998 | Morrison |
| 5,812,688 A | | 9/1998 | Gibson |
| 5,820,384 A | | 10/1998 | Tubman et al. |
| 5,822,370 A | | 10/1998 | Graupe |
| 5,839,108 A | | 11/1998 | Daberko et al. |
| 5,852,800 A | | 12/1998 | Modeste et al. |
| 5,872,851 A | | 2/1999 | Petroff |
| 5,991,313 A | | 11/1999 | Tanaka et al. |
| 6,167,375 A | | 12/2000 | Miseki et al. |
| 6,792,092 B1 | * | 9/2004 | Michalewicz ........... 379/202.01 |
| 2003/0059067 A1 | * | 3/2003 | Shibata ........................ 381/119 |

FOREIGN PATENT DOCUMENTS

| | | |
|---|---|---|
| WO | WO-97/37449 | 10/1997 |
| WO | WO-99/53612 A1 | 10/1999 |

OTHER PUBLICATIONS

Guide to the Use of ATSC Digital Television Standard, ATSC, Oct. 4, 1995, pp. 54-59. Available online at www.atsc.org/Standards/A54.

Digital Audio Compression Standard (AC-3), ATSC, Annex C "AC-3 Karaoke Mode", pp. 127-133. Available online at www.atsc.org/Standards/A52.

Shure Incorporated Homepage, available online at www.shure.com. The Examiner is encouraged to review the entire website for any relevant subject matter.

Digidesign's web page listing of their Aphex Aural Exciter. Available online at www.digidesign.com/products/all_prods.php3?location=main&product_id=8. The Examiner is encouraged to rview the entire website for any relevant subject matter.

International Search Report for Application No. PCT/US2001/02908; Applicant: Hearing Enhancement Company LLC; Date of Mailing: Apr. 9, 2001 (3 pages).

Supplementary European Search Report for Application No. EP 01903410; Applicant: Hearing Enhancement Company LLC; Date of Mailing: Jan. 6, 2007 (3 pages).

European Search Report and Opinion; European Patent Application No. EP 08160819.2; Applicant: Hearing Enhancement Company LLC; Date: Nov. 4, 2008; 8 pages.

* cited by examiner

USE OF VOICE-TO-REMAINING AUDIO (VRA) IN CONSUMER APPLICATIONS

CROSS REFERENCE TO RELATED APPLICATIONS

The present application is a continuation of U.S. application Ser. No. 11/154,816, filed Jun. 17, 2005 (now U.S. Pat. No. 7,337,111), which is a divisional of U.S. application Ser. No. 09/934,541, filed Aug. 23, 2001 (now U.S. Pat. No. 6,912,501); which is a continuation of U.S. application Ser. No. 09/580,206, filed May 26, 2000 (now U.S. Pat. No. 6,311,155); which claims the benefit of U.S. Provisional Application Ser. No. 60/180,220, filed Feb. 4, 2000.

U.S. application Ser. Nos. 11/154,816 and 09/934,541 are also continuations-in-part (CIPs) of U.S. application Ser. No. 09/673,275, filed Oct. 13, 2000 (now U.S. Pat. No. 7,415,120); which is a U.S. National Stage entry of PCT/US99/08055, filed Apr. 14, 1999; which claims benefit of U.S. Provisional Application Ser. No. 60/109,506, filed Nov. 23, 1998; and which is a continuation-in-part of: (a) U.S. application Ser. No. 09/059,303, filed Apr. 14, 1998 (now abandoned); (b) U.S. application Ser. No. 09/059,304, filed Apr. 14, 1998 (now abandoned); and (c) U.S. application Ser. No. 09/059,307, filed Apr. 14, 1998 (now abandoned). Each of the foregoing applications are incorporated by reference herein in their entireties.

FIELD OF THE INVENTION

Embodiments of the present invention relate generally to a method and apparatus for processing audio signals, and more particularly, to a method and apparatus for processing audio signals for use in consumer applications.

BACKGROUND OF THE INVENTION

End users with "high-end" or expensive equipment including multi-channel amplifiers and multi-speaker systems, currently have a limited capability to adjust the volume on the center channel signal of a multi-channel audio system independently of the audio signals on the other remaining channels. Since many movies have mostly dialog on the center channel and other sound effects located on other channels, this limited adjustment capability allows the end user to raise the amplitude of the mostly dialog channel so that it is more intelligible during sections with loud sound effects. Currently, this limited adjustment has important shortcomings. First, it is an adjustment capability that is only available to the end users that have an expensive digital versatile disk (DVD) player and a multi-channel speaker system such as a six-speaker home theater system that permits volume level adjustment of all speakers independently. Thus, user that cannot afford such a system cannot enjoy listening to a recording or broadcast program that allows the end user to raise the amplitude of the mostly dialog channel so that it is more intelligible.

Second, it is an adjustment that can only services one customer at a time. For example, if a user selects a level of mostly dialog to background that improves his listening intelligibility, this level however, may not be satisfactory to other individual in the room. Thus, there is no way to simultaneously provide this adjustment feature to multiple listeners having different hearing preferences.

Also, it is an adjustment that needs to be continuously modified during transients in a preferred audio signal or voice dialog (center channel) and remaining audio signal (all other channels). The final shortcoming is that a voice to remaining audio (VRA) adjustments that were acceptable during one audio segment of the movie program may not be good for another audio segment if the remaining audio level increases too much or the dialog level reduces too much.

It is a fact that a large majority of end users do not and will not have a home theater that permits this adjustment capability, i.e., Dolby Digital decoder, six-channel variable gain amplifier and multi-speaker system for many years. In addition, the end user does not have the ability to ensure that the VRA ratio selected at the beginning of the program will stay the same for an entire program.

FIG. 3 illustrates the intended spatial positioning setup of a common home theater system. Although there are no written rules for audio production in 5.1 spatial channels, there are industry standards. As used herein, the term "spatial channels refers to the physical location of an output device (e.g., speakers) and how the sound from the output device is delivered to the end user. One of these standards is to locate the majority of dialog on the center channel 526. Likewise other sound effects that require spatial positioning will be placed on any of the other four speakers labeled L 521, R 522, Ls 523, and Rs 524 for left, right, left surround and right surround. In addition, to avoid damage to midrange speakers, low frequency effects (LFE) are placed on the 0.1 channel directed toward a subwoofer speaker 525. Digital audio compression allows the producer to provide the user with a greater dynamic range for the audio that was not possible through analog transmission. This greater dynamic range causes most dialog to sound too low in the presence of some very loud sound effects. The following example provides an explanation. Suppose an analog transmission (or recording) has the capability to transmit dynamic range amplitudes up to 95 dB and dialog is typically recorded at 80 dB. Loud segments of remaining audio may obscure the dialog when that remaining audio reaches the upper limit while someone is speaking. However, this situation is exacerbated when digital audio compression allows a dynamic range up to 105 dB. Clearly, the dialog will remain at the same level (80 dB) with respect to other sounds, only now the loud remaining audio can be more realistically reproduced in terms of its amplitude. User complaints that dialog levels have been recorded too low on DVD's are very common. In fact, the dialog IS at the proper level and is more appropriate and realistic than what exists for analog recordings with limited dynamic range.

Even for consumers who currently have properly calibrated home theater systems, dialog is frequently masked by the loud remaining audio sections in many DVD movies produced today. A small group of consumers are able to find some improvement in intelligibility by increasing the volume of the center channel and/or decreasing the volume of all of the other channels. However, this fixed adjustment is only acceptable for certain audio passages and it disrupts the levels from the proper calibration. The speaker levels are typically calibrated to produce certain sound pressure level (SPL)s in the viewing location. This proper calibration ensures that the viewing is as realistic as possible. Unfortunately this means that loud sounds are reproduced very loud. During late night viewing, this may not be desirable. However, any adjustment of the speaker levels will disrupt the calibration.

SUMMARY OF THE INVENTION

A method for providing multiple users with voice-to-remaining audio (VRA) adjustment capability includes receiving at a first decoder a voice signal and a remaining audio signal and simultaneously receiving at a second decoder, the voice signal and the remaining audio signal, wherein the voice signal and the remaining audio signal are received separately; and separately adjusting by each of the decoders, the separately received voice and remaining audio signals.

DETAILED DESCRIPTION

Figure 1:
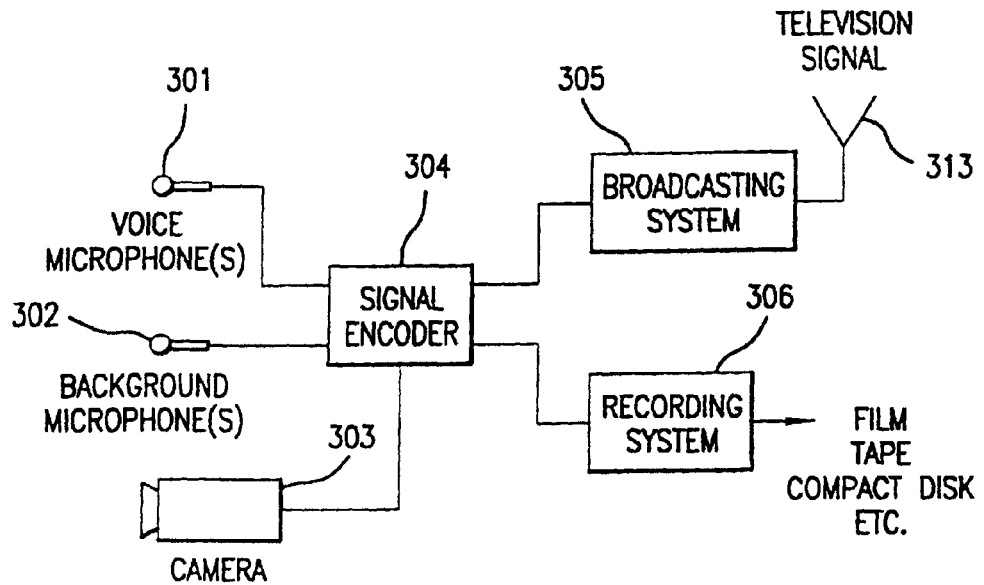
FIG. 1 illustrates a general approach according to the present invention for separating relevant voice information from general background audio in a recorded or broadcast program.

The present invention describes a method and apparatus for providing voice-to-remaining audio capability. In addition, the invention discloses technological, ergonomical, economical, and applications specific improvements to voice-to-remaining audio (VRA) and AutoVRA. VRA refers to the personalized adjustment of an audio program's voice to remaining audio ratio by separately adjusting the vocal (speech or voice) volume independently of the separate adjustment of the remaining audio volume (which may include music, sound effects, laughter, or other non-speech sounds that are included in a total audio program). AutoVRA or AutoVRA hold refers to the automatic adjustment of the VRA ratio so that program transients (such as an explosion) do not obscure the voice.

Significance of Ratio of Preferred Audio to Remaining Audio

The present invention begins with the realization that the listening preferential range of a ratio of a preferred audio signal relative to any remaining audio is rather large, and certainly larger than ever expected. This significant discovery is the result of a test of a small sample of the population regarding their preferences of the ratio of the preferred audio signal level to a signal level of all remaining audio.

Specific Adjustment of Desired Range for Hearing Impaired or Normal Listeners

Very directed research has been conducted in the area of understanding how normal and hearing impaired users perceive the ratio between dialog and remaining audio for different types of audio programming. It has been found that the population varies widely in the range of adjustment desired between voice and remaining audio.

Two experiments have been conducted on a random sample of the population including elementary school children, middle school children, middle-aged citizens and senior citizens. A total of 71 people were tested. The test consisted of asking the user to adjust the level of voice and the level of remaining audio for a football game (where the remaining audio was the crowd noise) and a popular song (where the remaining audio was the music). A metric called the VRA (voice to remaining audio) ratio was formed by dividing the linear value of the volume of the dialog or voice by the linear value of the volume of the remaining audio for each selection.

Several things were made clear as a result of this testing. First, no two people prefer the identical ratio for voice and remaining audio for both the sports and music media. This is very important since the population has relied upon producers to provide a VRA (which cannot be adjusted by the consumer) that will appeal to everyone. This can clearly not occur, given the results of these tests. Second, while the VRA is typically higher for those with hearing impairments (to improve intelligibility) those people with normal hearing also prefer different ratios than are currently provided by the producers.

It is also important to highlight the fact that any device that provides adjustment of the VRA must provide at least as much adjustment capability as is inferred from these tests in order for it to satisfy a significant segment of the population. Since the video and home theater medium supplies a variety of programming, we should consider that the ratio should extend from at least the lowest measured ratio for any media (music or sports) to the highest ratio from music or sports. This would be 0.1 to 20.17, or a range in decibels of 46 dB. It should also be noted that this is merely a sampling of the population and that the adjustment capability should theoretically be infinite since it is very likely that one person may prefer no crowd noise when viewing a sports broadcast and that another person would prefer no announcement. Note that this type of study and the specific desire for widely varying VRA ratios has not been reported or discussed in the literature or prior art.

In this test, an older group of men was selected and asked to do an adjustment (which test was later performed on a group of students) between a fixed background noise and the voice of an announcer, in which only the latter could be varied and the former was set at 6.00. The results with the older group were as follows:

TABLE I

| Individual | Setting |
|---|---|
| 1 | 7.50 |
| 2 | 4.50 |
| 3 | 4.00 |
| 4 | 7.50 |
| 5 | 3.00 |
| 6 | 7.00 |
| 7 | 6.50 |
| 8 | 7.75 |
| 9 | 5.50 |
| 10 | 7.00 |
| 11 | 5.00 |

To further illustrate the fact that people of all ages have different hearing needs and preferences, a group of 21 college students was selected to listen to a mixture of voice and background and to select, by making one adjustment to the voice level, the ratio of the voice to the background. The background noise, in this case crowd noise at a football game, was fixed at a setting of six (6.00) and the students were allowed to adjust the volume of the announcers' play by play voice which had been recorded separately and was pure voice or mostly pure voice. In other words, the students were selected to do the same test the group of older men did. Students were selected so as to minimize hearing infirmities caused by age. The students were all in their late teens or early twenties. The results were as follows:

TABLE II

| Student | Setting of Voice |
|---|---|
| 1 | 4.75 |
| 2 | 3.75 |
| 3 | 4.25 |
| 4 | 4.50 |
| 5 | 5.20 |
| 6 | 5.75 |
| 7 | 4.25 |
| 8 | 6.70 |
| 9 | 3.25 |
| 10 | 6.00 |
| 11 | 5.00 |
| 12 | 5.25 |
| 13 | 3.00 |
| 14 | 4.25 |
| 15 | 3.25 |
| 16 | 3.00 |
| 17 | 6.00 |
| 18 | 2.00 |
| 19 | 4.00 |
| 20 | 5.50 |
| 21 | 6.00 |

The ages of the older group (as seen in Table I) ranged from 36 to 59 with the preponderance of the individuals being in the 40 or 50 year old group. As is indicated by the test results, the average setting tended to be reasonably high indicating some loss of hearing across the board. The range again varied from 3.00 to 7.75, a spread of 4.75 which confirmed the findings of the range of variance in people's preferred listening ratio of voice to background or any preferred signal to remaining audio (PSRA). The overall span for the volume setting for both groups of subjects ranged from 2.0 to 7.75. These levels represent the actual values on the volume adjustment mechanism used to perform this experiment. They provide an indication of the range of signal to noise values (when compared to the "noise" level 6.0) that may be desirable from different users.

To gain a better understanding of how this relates to relative loudness variations chosen by different users, consider that the non-linear volume control variation from 2.0 to 7.75 represents an increase of 20 dB or ten (10) times. Thus, for even this small sampling of the population and single type of audio programming it was found that different listeners do prefer quite drastically different levels of "preferred signal" with respect to "remaining audio." This preference cuts across age groups showing that it is consistent with individual preference and basic hearing abilities, which was heretofore totally unexpected.

As the test results show, the range that students (as seen in Table II) without hearing infirmities caused by age selected varied considerably from a low setting of 2.00 to a high of 6.70, a spread of 4.70 or almost one half of the total range of from 1 to 10. The test is illustrative of how the "one size fits all" mentality of most recorded and broadcast audio signals falls far short of giving the individual listener the ability to adjust the mix to suit his or her own preferences and hearing needs. Again, the students had a wide spread in their settings as did the older group demonstrating the individual differences in preferences and hearing needs. One result of this test is that hearing preferences is widely disparate.

Figure 3:
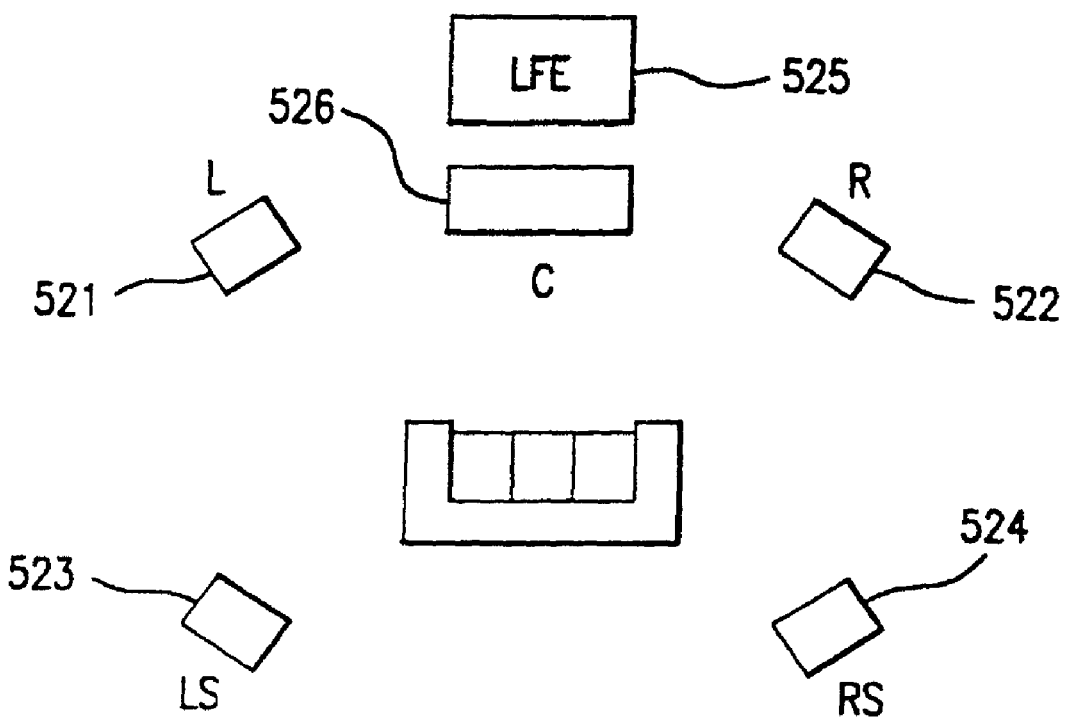
FIG. 3 illustrates the intended spatial positioning setup of a common home theater system.

Further testing has confirmed this result over a larger sample group. Moreover, the results vary depending upon the type of audio. For example, as shown in FIG. 3, when the audio source was music, the ratio of voice to remaining audio varied from approximately zero to about 10, whereas when the audio source was sports programming, the same ratio varied between approximately zero and about 20. In addition, the standard deviation increased by a factor of almost three, while the mean increased by more than twice that of music.

The end result of the above testing is that if one selects a preferred audio to remaining audio ratio and fixes that forever, one has most likely created an audio program that is less than desirable for a significant fraction of the population. And, as stated above, the optimum ratio may be both a short-term and long-term time varying function. Consequently, complete control over this preferred audio to remaining audio ratio is desirable to satisfy the listening needs of "normal" or non-hearing impaired listeners. Moreover, providing the end user with the ultimate control over this ratio allows the end user to optimize his or her listening experience.

The end-user's independent adjustment of the preferred audio signal and the remaining audio signal will be the apparent manifestation of one aspect of the present invention. To illustrate the details of the present invention, consider the application where the preferred audio signal is the relevant voice information.

Creation of the Preferred Audio Signal and the Remaining Audio Signal

FIG. 1 illustrates a general approach to separating relevant voice information from general background audio in a recorded or broadcast program. There will first need to be a determination made by the programming director as to the definition of relevant voice. An actor, group of actors, or commentators must be identified as the relevant speakers.

Once the relevant speakers are identified, their voices will be picked up by the voice microphone 301. The voice microphone 1 will need to be either a close talking microphone (in the case of commentators) or a highly directional shot gun microphone used in sound recording. In addition to being highly directional, these microphones 301 will need to be voice-band limited, preferably from 200-5000 Hz. The combination of directionality and band pass filtering minimize the background noise acoustically coupled to the relevant voice information upon recording. In the case of certain types of programming, the need to prevent acoustic coupling can be avoided by recording relevant voice of dialogue off-line and dubbing the dialogue where appropriate with the video portion of the program. The background microphones 302 should be fairly broadband to provide the full audio quality of background information, such as music.

A camera 303 will be used to provide the video portion of the program. The audio signals (voice and relevant voice) will be encoded with the video signal at the encoder 304. In general, the audio signal is usually separated from the video signal by simply modulating it with a different carrier frequency. Since most broadcasts are now in stereo, one way to encode the relevant voice information with the background is to multiplex the relevant voice information on the separate stereo channels in much the same way left front and right front channels are added to two channel stereo to produce a quadraphonic disc recording. Although this would create the need for additional broadcast bandwidth, for recorded media this would not present a problem, as long as the audio circuitry in the video disc or tape player is designed to demodulate the relevant voice information.

Once the signals are encoded, by whatever means deemed appropriate, the encoded signals are sent out for broadcast by broadcast system 305 over antenna 313, or recorded on to tape or disc by recording system 306. In case of recorded audio video information, the background and voice information could be simply placed on separate recording tracks.

Receiving and Demodulating the Preferred Audio Signal and the Remaining Audio

Figure 2:
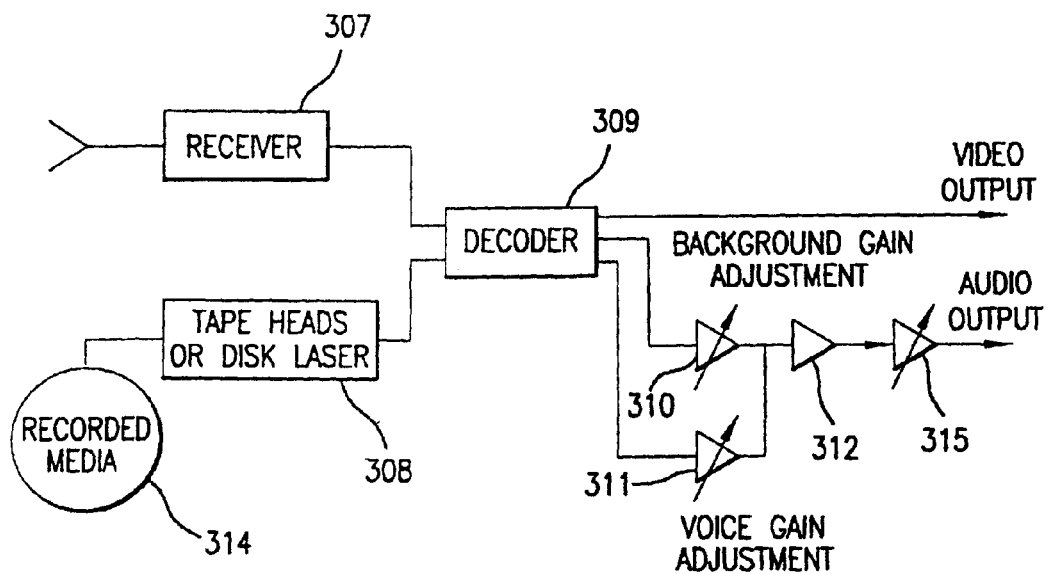
FIG. 2 illustrates an exemplary embodiment according to the present invention for receiving and playing back the encoded program signals.

FIG. 2 illustrates an exemplary embodiment for receiving and playing back the encoded program signals. A receiver system 307 demodulates the main carrier frequency from the encoded audio/video signals, in the case of broadcast information. In the case of recorded media 314, the heads from a VCR or the laser reader from a CD player 308 would produce the encoded audio/video signals.

In either case, these signals would be sent to a decoding system 309. The decoder 309 would separate the signals into video, voice audio, and background audio using standard decoding techniques such as envelope detection in combination with frequency or time division demodulation. The background audio signal is sent to a separate variable gain amplifier 310, that the listener can adjust to his or her preference. The voice signal is sent to a variable gain amplifier 311, that can be adjusted by the listener to his or her particular needs, as discussed above.

The two adjusted signals are summed by a unity gain summing amplifier 132 to produce the final audio output. Alternatively, the two adjusted signals are summed by unity gain summing amplifier 312 and further adjusted by variable gain amplifier 315 to produce the final audio output. In this manner the listener can adjust relevant voice to background levels to optimize the audio program to his or her unique listening requirements at the time of playing the audio program. As each time the same listener plays the same audio, the ratio setting may need to change due to changes in the listener's hearing; the setting remains infinitely adjustable to accommodate this flexibility.

VRA and AutoVRA Embodiments

Figure 4:
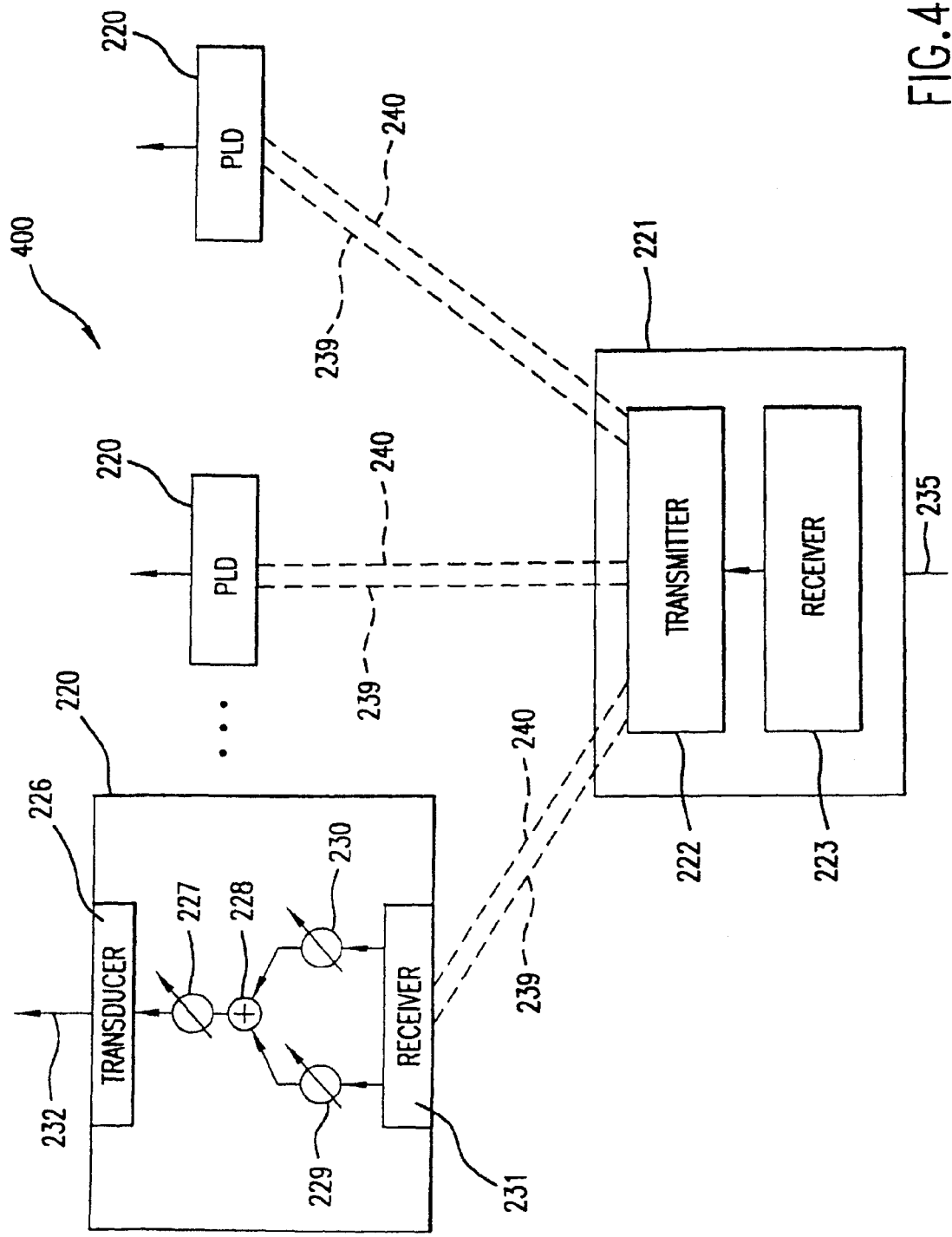
FIG. 4 illustrates a block diagram of a voice-to-remaining audio (VRA) system for simultaneous multiple broadcasting according to an embodiment of the present invention.

As stated above, preferred ratio of voice to remaining audio differs significantly for different people and differs for different types of programming (sports versus music, etc.). FIG. 4 is a block diagram illustrating VRA system for simultaneous multiple users according to an embodiment of the present invention. A shown, system 400 includes transceiver 210, and a plurality of playback devices such as a personal listening devices (PLD) 220. Although only three PLDs are shown, more PLDs can be used without departing from the spirit and scope of the present invention.

Transceiver 210 includes a receiver component 223 and a transmitter component 222 and receives either a broadcast or a recorded signal 235. According to one embodiment of the present invention, signal 235 includes a separate voice component signal and remaining audio component signal transmitted to transceiver 210 simultaneously. These signals could be decoded by a decoder (not shown) before further processing. Alternatively, signal 235 could be processed by system components and circuitry in transmitter 222 such that a separate voice component 239 and a separate remaining audio component 240 are created.

The separate voice and remaining audio signal components are transmitted to each PLD by transmitter 221 by way of a wireless or infrared transmit or by multi-wired transmit). The received signals are received by PLD receiver 231 which may be for example, an infrared receiver, a wireless radio frequency receiver, or a mult-port audio input jack for a wired connection. One of the outputs from PLD receiver 231 received voice signal 239, is sent to a separate variable gain amplifier 229, that the end user can adjust to his or her preference. The other output, received remaining audio signal 240, is sent to a variable gain amplifier 230, that can be adjusted by the listener to his or her particular listening preference. These adjusted signals are summed by adder 228 and may also be further adjusted by gain amplifier 227 before being forwarded to transducer 226. Transducer converts the electrical signal from gain amplifier 227 into an audible acoustic audio signal 232.

As discussed above, the embodiment shown in FIG. 4 discloses transmitting two (or more) signals where at least one signal is a speech only or mostly speech only signal (voice) and the other signal(s) contains the remaining audio (which may also contain some speech). If the remaining audio contains some speech, however, the VRA ratio can only be made more positive, and will improve dialog intelligibility.

For multiple users in the same environment, a separate adjustment of the VRA can be accomplished if each user is listening to a program on a personal listening device (PLD) which may include but is not limited to headphones, hearing aids, cochlear implants, assistive listening devices, eyewear or headwear that incorporates speakers. Such eyewear may include, for example, eyeglasses worn with speakers, or wearable computers. A PDU as used in this context will be defined to mean an audio reproduction device capable of receiving an electrical or wireless signal and converting it into audible sound in a manner that does not disturb other listeners in the same general environment.

After reception of the two (or more) signals at the personal listening device, the signals are separately adjusted by independent volume controls (or other types of controls as described later) so that a preferred VRA for that individual user is achieved. The signals are then combined, and further amplified and adjusted and transduced by the personal listening device to become audible sound. Since the personal listening device is not interfering with others in the same listening environment who may also have a personal listening device (with a different preferred VRA setting), multiple listeners in the same environment can independently adjust the VRA for their own listening pleasure. This is facilitated by the fact that the signals are transmitted (wired or wirelessly) to everybody in the audience simultaneously. One possible application for this technology is in a public movie theater. Multiple listeners can all enjoy the same movie with independent VRA adjustments on their headsets, ALD's, hearing aids or other personal listening devices as discussed above. FIG. 4 illustrates these points through the following brief description.

Transmission Into Audience

In order for each end user to independently adjust the level of the voice with respect to the remaining audio, the signals either arrive at the personal listening device separately or arrive in such a way (possibly encoded) that the two signals can be separated prior to independent adjustment. The transmission of two signals, for example, can be accomplished using an FM stereo transmission where the voice (or remaining audio) is transmitted on the left (or right) channel. If a stereo program is desired at the PLD then a more complex multi-channel transmission is required. If both voice and the remaining audio have spatial information, a four channel transmission (either wired or wireless) and reception is required to present the multi-channel program to the end user.

Figure 5:
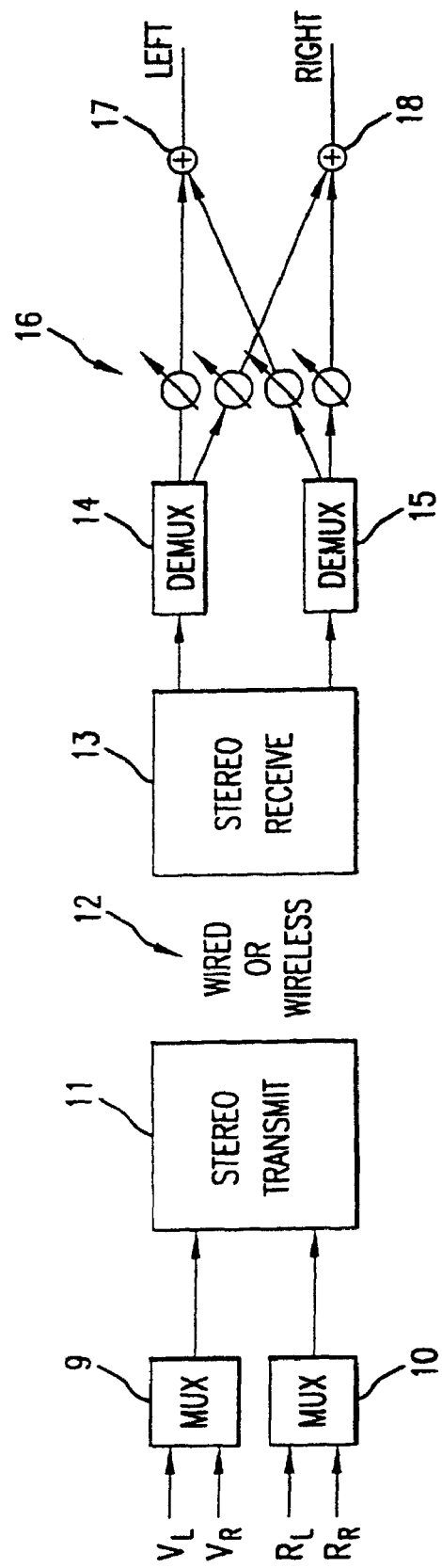
FIG. 5 illustrates an embodiment for multi-channel transmission according to the present invention.

FIG. 5 illustrates one possible embodiment for this multi-channel transmission according to the principles of the present invention. The left voice and right voice programs are multiplexed (or instead coded) together 9 as are the remaining audio left and right programs 10. This allows a two-channel stereo transmission 11 through a wired or wireless means 12 to be received by a stereo receiver 13. The four signals are then derived and adjusted 16 independently to form a total left 17 and right 18 program with spatial information from the voice and remaining audio signals. There are many possible ways to transmit these signals for separate adjustment while retaining spatial information. Others might include the transmission of a left and right remaining audio program along with a separate mono voice channel (since vocal information is predominantly non-spatial).

Center Channel Adjustment

Figure 6:
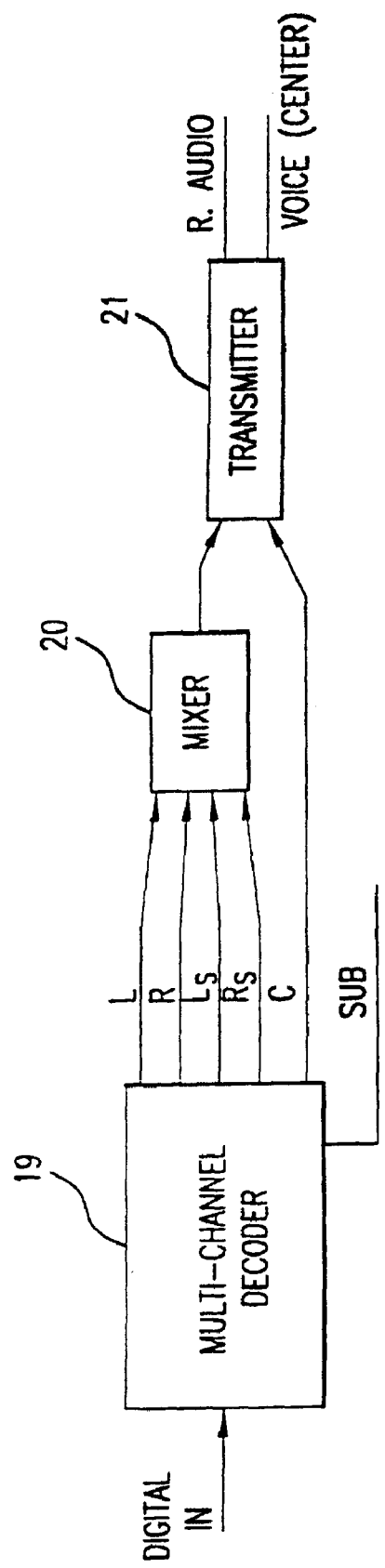
FIG. 6 illustrates an alternative embodiment of the present invention.

As an extension to the above discussion, the transmission of the center channel of multi-channel programming is also considered to be related to the VRA adjustment capability. For most multi-channel programming, the center channel contains most of the dialog in a movie. In addition, most sound effects and music are directed toward one or more of the other 4.1 audio channels. Currently, a purely voice channel is not made available to the general public. Therefore, before a pure voice channel is made available to the general public for most broadcasting and recording, the center channel can serve as the voice channel described above. Therefore the receiver in FIG. 4 could be a multi-channel sound decoder such as a Digital Theater Sound (DTS), Sony Dynamic Digital Sound (SDDS), Dolby Digital, or other multi-channel format decoder. The output of such a decoder 19 as shown in FIG. 6, converts a digital input into left, right, left surround, right surround, center and subwoofer analog outputs. The mixer 20 can combine all channels but the center (in varying ratios depending on the desired spatial effect) so that the output is either a stereo or mono signal channel that is transmitted 21 separately and simultaneously with the center channel which approximates the dialog only channel. The reception can be carried out as shown in FIG. 4.

Decoder Inside Personal Listening Device and Provision for Spatial Processing

Figure 7:
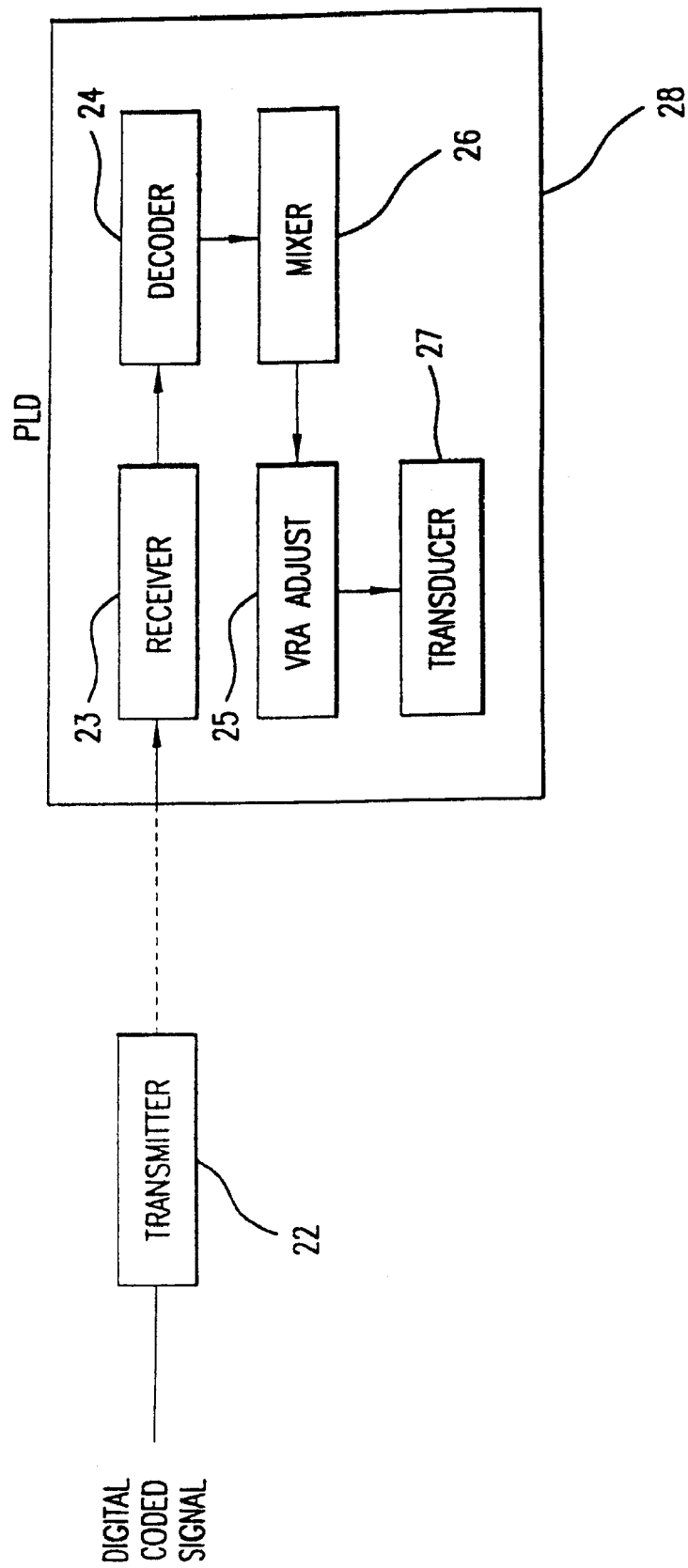
FIG. 7 illustrates an alternative embodiment of the present invention.

It should be noted that although the embodiment in FIG. 6 combined with FIG. 4 implies transmission of analog signals to the PLD with the receiver or multi-channel decoder in a centralized location, it is not beyond the scope of this invention to include the multi-channel decoder in the PLD where the signal that is transmitted is a digital signal that requires decoding in order to extract the voice and remaining audio. FIG. 7 illustrates this concept. A digital signal that is read from a media source, by way of example (DVD, CD, TIVO, or Replay recorder, etc.) or received from a broadcast (as in digital television or digital radio) is transmitted 22 directly to the PLD 28. The PLD has a built-in receiver 23 to receive the infrared, radio or other broadcast signal that feeds the decoder 24 that is designed to meet the decoding specification of the intended compression format for which it operates, by way of example (such as Dolby Digital or DTS). The mixer 26 uses the outputs of the decoder to generate the remaining audio and voice signals (either pure voice signal or center channel signal) that are adjusted separately by the user with gain amplifiers and/or attenuators 25 and are then recombined as disclosed above and are transduced 27 to audible audio that is the output of the PLD. This particular embodiment may be more feasible to achieve a multi-channel audio presentation at the PLD because the transmitted signal is digital (less susceptible to interfering noise) and only requires one transmission channel; but may be more expensive as the decoding process is done in each individual PLD rather than at a centralized location. The multi-channel presentation may include any signal processing that spatially relocates the left, left surround, right, right surround and or center aural presentations to feel more natural in a PLD such as, by way of example, a headset. The VRA adjustment is intended to work in conjunction with this type of processing in order to provide improved dialog intelligibility without affecting any spatial processing done in addition to the user adjustable VRA mixture.

Figure 8:
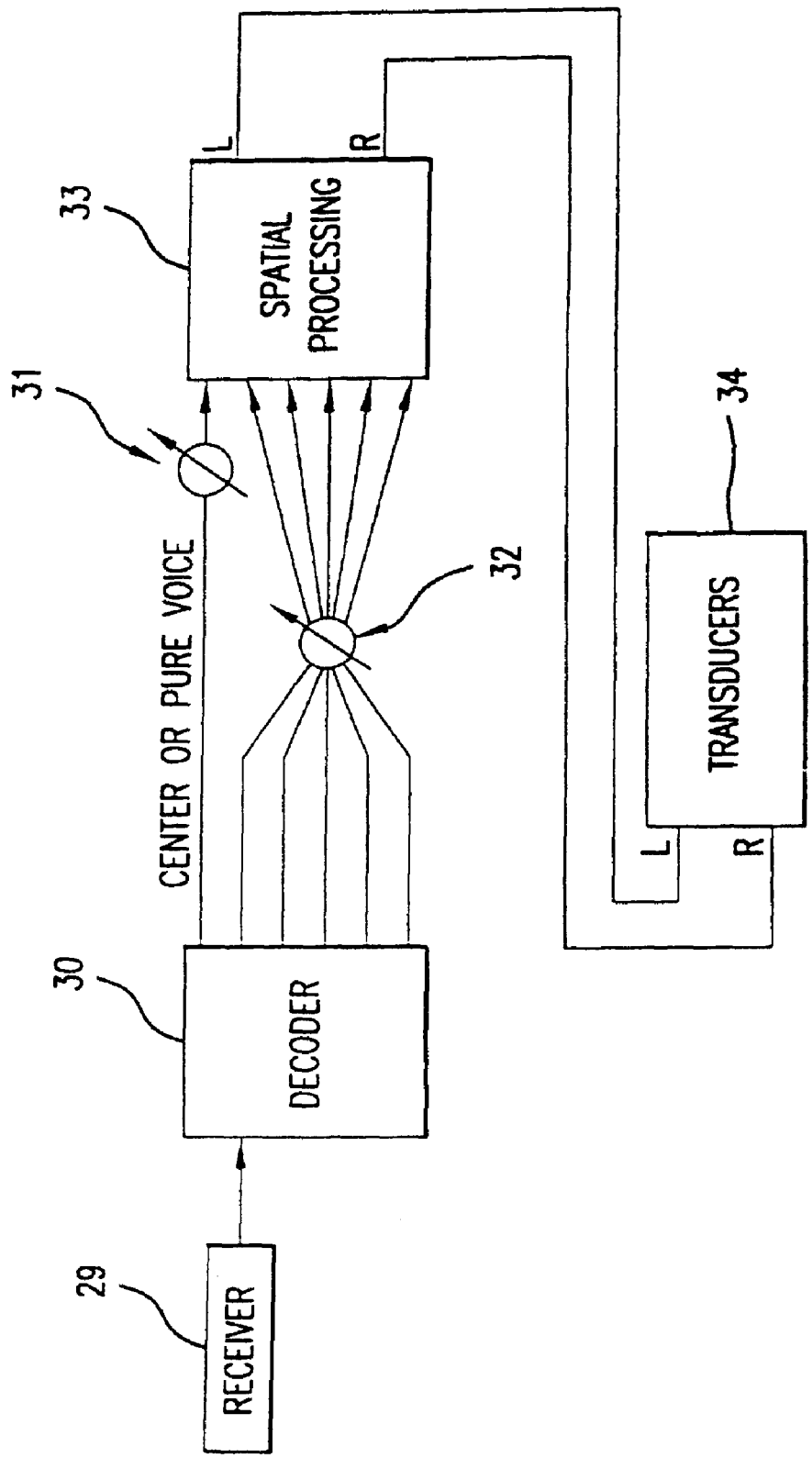
FIG. 8 illustrates an alternative embodiment of the present invention that includes signal processing for multi-channel presentation.

FIG. 8 provides further detail of one possible embodiment that includes signal processing for multi-channel presentation. The receiver 29 and decoder 30 are located either centrally or on the PLD depending on the embodiment preferred for implementation. The center channel or other pure voice channel is separately adjusted 31 before the spatial processing occurs as is the level adjustment of all remaining audio 32. The spatial processing 33 then receives the multi-channel presentation (or in some cases two channel presentation) as it was originally recorded and then generates a more realistic sound stage for the PLD. In this case the spatial processing 33 is not affected by the VRA adjustment but the user can still select the desired level of the voice with respect to the remaining audio.

"Volume Controls" Enabled by VRA Purpose (Attenuator)

Figure 9:
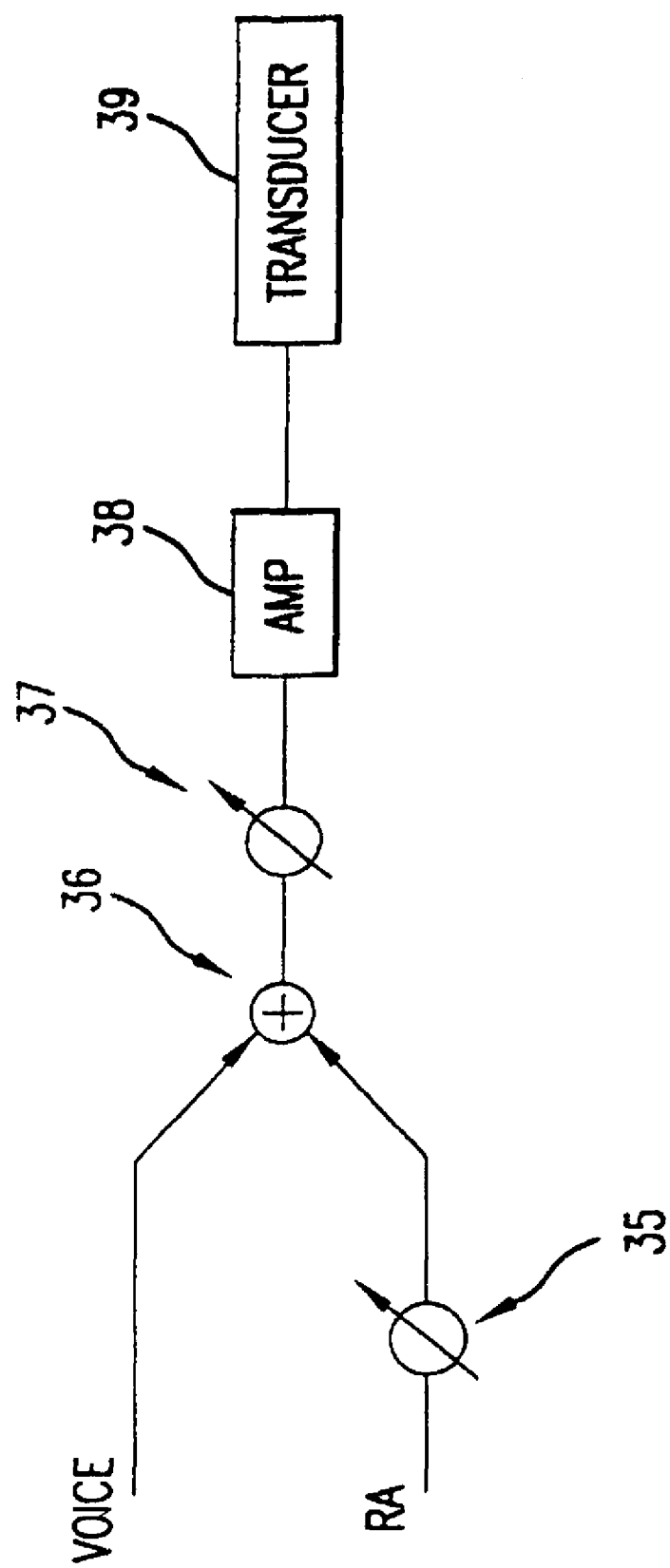
FIG. 9 illustrates an alternative embodiment of the present invention.

The physical adjustment mechanisms of the voice and remaining audio and total volume signal control have many possible embodiments. The most general adjustment mechanism occurs when the voice has a user adjustable gain, the remaining audio signal has a user adjustable gain, and the total volume of the summed signal has a further gain adjustment (total volume control). This is shown in detail in FIG. 4. When a user is attempting to set the VRA ratio in addition to a desired overall level for comfort, a further embodiment provides a more user friendly adjustment mechanism with fewer steps in the adjustment process. As with most entertainment, dialog is the target sound around which the program centers. Therefore, as shown in FIG. 9, the overall level of the dialog will control the loudness of the program, i.e. the overall program level is usually set based on the level of the dialog. Therefore by having only two controls (a total volume level adjustment and a remaining audio attenuator) the user can select the desired VRA and total volume level with a simple two step process. First the overall level is set with the total volume adjustment 37 (in FIG. 9) thereby adjusting the level of the voice in the main program. At this point the dialog is at the desired listening level and only the VRA needs to be set. By having only an attenuator on the remaining audio, the intelligibility can be improved to a theoretical 100% by turning down the remaining audio without affecting the voice level. In addition, an attenuator can be implemented using a variable voltage divider which requires no power but still allows the user to adjust to all values of VRA ratios greater than 0 dB. To conserve additional power, the main volume adjustment 37 following the summer 36 can also be implemented as an attenuator. Provided the amplifier 38 has been designed with sufficient gain to power the transducer 39 for the loudest volume level when the attenuator 37 is passing the full signal with no voltage division. As an additional embodiment, the volume 35 can be placed on the voice instead of the remaining audio to allow the user to control the overall program level as a function of the remaining audio rather than the dialog. It would not be desirable to place an attenuator on the voice because positive VRA ratios could not be achieved. Instead it would be necessary, if the current embodiment were implemented, to place an active gain stage on the voice so that the level could be raised sufficiently high over the unaffected remaining audio so as to provide a sufficiently positive VRA ratio. The overall loudness is then controlled by the total volume control as before.

"Ratio Balance" Realized in a Single Dial

Figure 10:
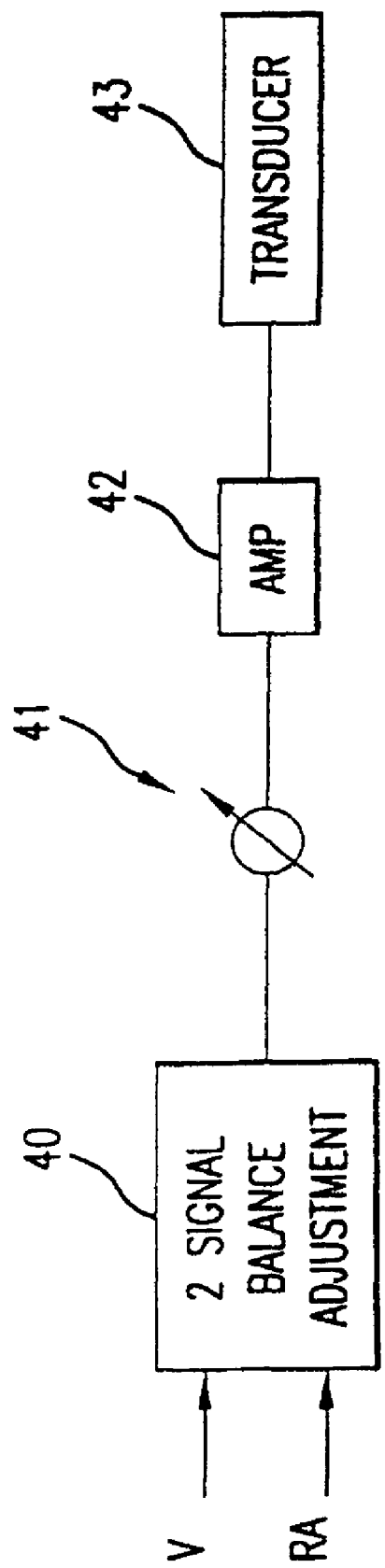
FIG. 10 illustrates an embodiment of having a voice component and remaining audio component summed and continually adjusted by a single control.

A further embodiment for VRA and total volume adjustment according to the present invention is provided with a VRA knob used as a single adjustment with two inputs. This single knob adjustment, contrary to the dual knob level controls and the single knob attenuator, can adjust the balance between the voice and remaining audio. FIG. 10 illustrates the voice and remaining audio being summed and continually adjusted by a single control 40 and further adjusted with a total audio gain control (active or attenuator) 41. The balance control itself has received a well known application in the adjustment of front to back fade or right to left balance on car or home stereo systems. There is a key difference in this application in that it is adjusting the ratio of the content rather than the location of the audio on individual speakers. In fact, further balance style controls can be implemented in order to adjust the spatial positioning of the audio if desired. By implementing the single knob VRA control, the user can completely adjust the VRA (all ratios available) using a single knob. The overall volume can then be adjusted based on the desired level.

AutoVRA

The AutoVRA hold feature allows the end user to not only adjust the desired ratio of voice to remaining audio but to "lock-in" that ratio with respect to transient volume changes in either the voice or the remaining audio. For example, a football game contains dialog from the announcers and background noise from the cheering fans. If the desired VRA is set during a point in time when the fans are relatively quiet, it is possible that as the fans become louder (but the announcers stay at the same level) the crowd noise could obscure the voice of the announcers. Likewise if the VRA is set during a segment when the announcers are speaking very loud, it is possible that when the announcers return to a normal speaking volume, the level is too low for good intelligibility.

VRA Technique Based on Standard Deviation

To prevent the user from continually adjusting these levels, the user can press a button after the ratio has been set and that ratio will be stored and maintained for the rest of the programming. One method for accomplishing this is at the moment the button is selected, the standard deviations of the voice signal and the remaining audio signal are computed and stored. Then as the program continues, a real time computation of the standard deviation for each signal continues. If that deviation exceeds the stored value, the signal is multiplied by the ratio of the stored value over the actual value, thereby lowering the volume. Likewise if the deviation is too far below the stored value the signal can be multiplied by the same ratio to raise the level. If it is desired to raise the level (when the actual deviation is below the stored deviation) then it is necessary to detect segments when the signal is not present so the noise floor isn't amplified unnecessarily. A situation could occur where that ratio becomes close to infinity if the actual deviation is near zero.

The most general form of the AutoVRA method discussed here is shown in the following equation:

$$\text{Output} = G_3\left[G_1\left(\frac{\sigma_{Vstored}}{\sigma_{Vactual}}\right)V + G_2\left(\frac{\sigma_{Rstored}}{\sigma_{Ractual}}\right)RA\right]$$

wherein:

$G_1$=volume control of the voice;
$G_2$=volume control of remaining audio;
$G_3$=total volume control;
V=voice;
RA=remaining audio;
$\sigma_{Vactual}$=standard deviation of the actual voice;
$\sigma_{Ractual}$=standard deviation of the actual remaining device;
$\sigma_{Vstored}$=standard deviation of the stored voice; and
$\sigma_{Rstored}$=standard deviation of the stored remaining audio.

The stored standard deviation of each of the respective signals (voice and remaining audio) is stored and compared to the actual standard deviations in real time. Here, standard deviation is used as a measure of the level of each of the signals. Other metrics may also be used including the peak level over a period of time. In order to control the volume adjustment and the effects it has on the overall signal level output, it may be desirable to compute the standard deviations after the gains $G_1$ and $G_2$ have been applied to the signal. The results are slightly different in that after the standard deviations have been stored, further volume adjustments on the voice and remaining audio will be ineffective until a new stored value is entered. If this is a desirable feature then the deviation computations for V (voice) and RA (remaining audio) should include the user selectable gains $G_1$ and $G_2$. If further adjustment is desired then the gains can be applied after the deviation computation and multiplication as shown above.

Figure 11:
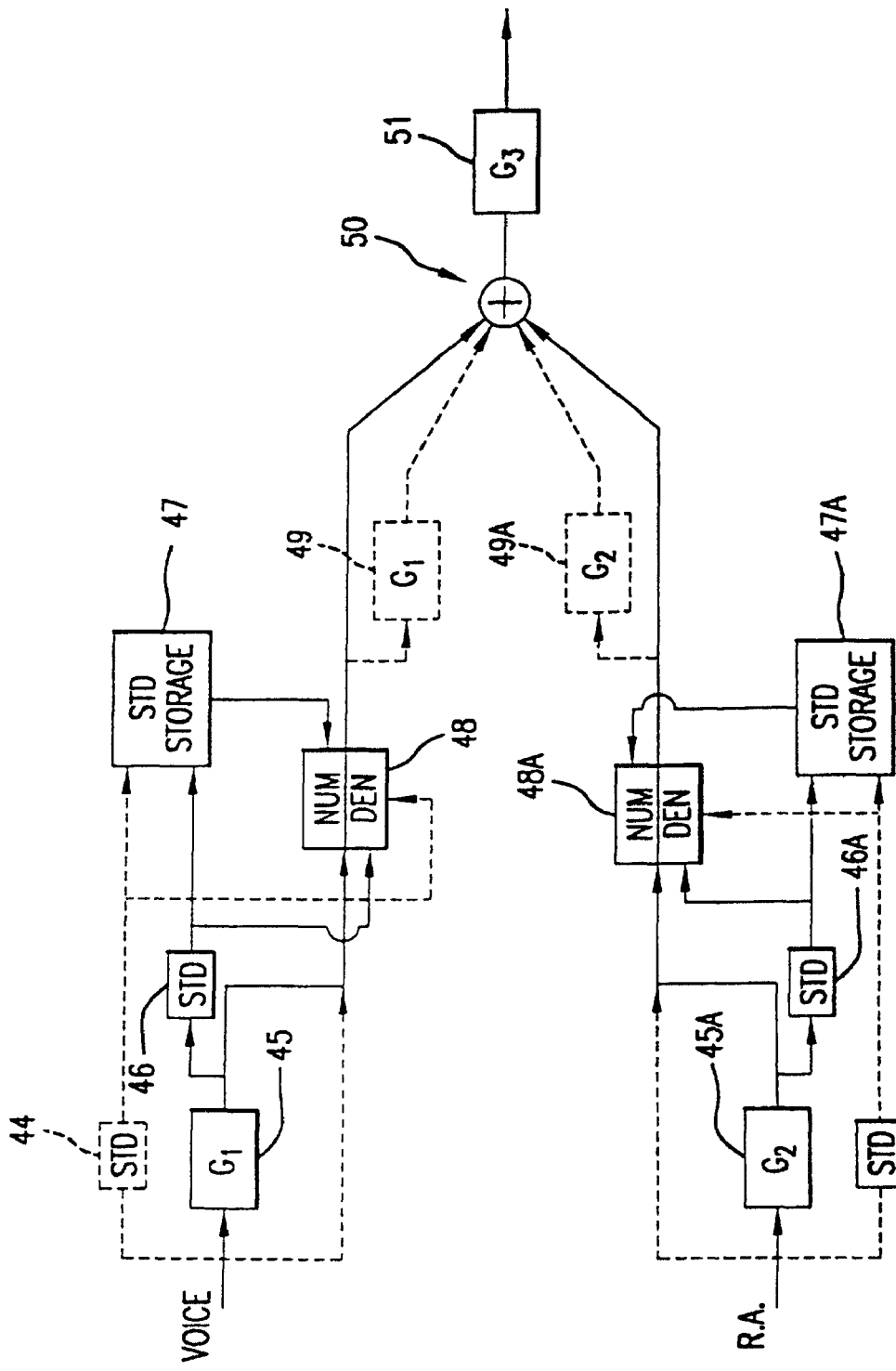
FIG. 11 illustrates an alternative embodiment of the present invention utilizing AutoVRA.

FIG. 11 illustrates these concepts in further detail. Both the voice and remaining audio signal experience the same operations separately. It should be noted that a simpler and very effective implementation of this concept is to remove the operations performed on the voice signal and only modify the remaining audio as the standard deviation changes. The reasoning behind this is to decrease the required computational overhead by half (removing computation performed on the voice signal) because it is assumed that variation in the dialog channel is small when compared to the variation that might exist on the remaining audio channel. Nevertheless, the most general implementation is presented in FIG. 11 showing operations on both the voice and remaining audio signals. The dotted lines indicate redundant options that are not to be used in conjunction with the solid lines, but do offer differences in performance as described in the previous paragraph. The user adjustable dialog gain 45 can be applied either before (using element 46) or after (using element 44) the standard deviation calculation occurs. When a desired performance is selected by the user at an instant in time, the standard deviations of the voice and remaining audio are stored to a memory location (47 and 47A) that can be volatile or non-volatile memory. This stored value is used in the numerator of the multiplication process 48 and 48A for each signal while the denominator is the current actual standard deviation whether before or after the user adjustable gain stage. (Note that both solid and dotted are not implemented at the same time). Not shown is a conditional that decides if the current ratio is higher or lower than unity. If it is lower than unity, that indicates that the current actual level is higher than the stored level and the volume should be reduced by the ratio. If it is higher it may be desirable to not do anything and simply pass the signal affected only by the user adjustable gain value (this requires an "if" style statement that checks a ratio condition against the current condition and makes a decision). This prevents very large ratios from multiplying lower level signals resulting in very high noise levels for quiet passages. Furthermore, a lower limit may be set on the ratio through a further condition that will allow moderately low levels to be amplified accordingly but very low levels (or absence) of signal to be unmodified or modified by the last value of the ratio before the condition was violated.

Storage of Distinct VRA and AutoVRA Settings

The storage of user preferred ratio levels in 47 and 47A is beneficial for controlling the sound over different types of programming or different listeners using the same hardware/software. Since all users prefer a different VRA and the respective audio levels may change for different types of programming, it is considered necessary to provide for multiple storage areas for different types of programming and different users. Applying, by way of example, a name or a password to each storage location will allow different users to recall different VRA settings for specific programs. Depending on the method used from FIG. 11, the storage elements may include the desired voice level, the desired voice standard deviation, the desired remaining audio level, and/or the desired remaining audio standard deviation. This will allow a user to return to the playback device with the same setting (possibly a different one for sports than for sitcoms) without readjusting the VRA levels and resetting the Hold feature. There is no limit specified to the number of storage locations that can be available on the playback device. FIG. 11 illustrates the user adjustments, by way of example, as buttons that select the current standard deviations to be the stored standard deviations. In addition there are user controls over $G_1$, $G_2$, and $G_3$. There are several methods to provide these adjustments to the end user depending on the hardware that they are used on. A headset, for example might have several buttons to store different ratios and select those ratios depending on the duration that the button is held. If these controls are used with a personal computer, personal data assistant, or cell phone, they might be graphical user interface controls implemented using software. In order to further simplify the adjustments, it is possible to combine all of the adjustments (VRA and AutoVRA ratio hold) into a single control. The ratio of the remaining audio to the voice can be controlled as in FIG. 10 with a single balance control. However, in order to implement the AutoVRA feature described by FIG. 11, it is necessary to modify the performance of the knob by adding the ratio hold.

Figure 12:
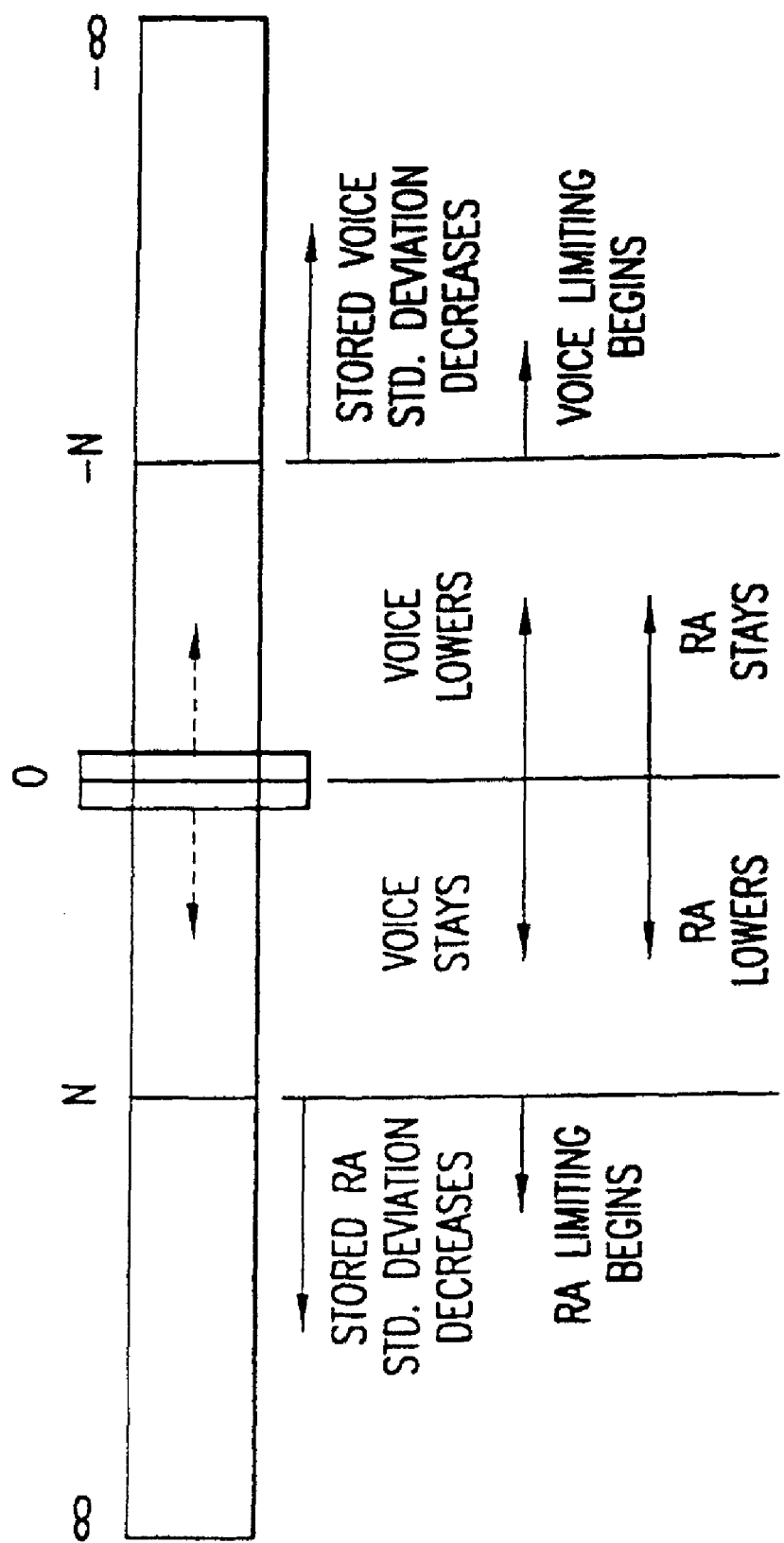
FIG. 12 illustrates an embodiment of the present invention wherein various functions of a slide control are shown.

FIG. 12 is a diagram that illustrates the various function of a slider control that has been designed to accomplish all of the functions using a single control. (Note that this can be any type of control including a rotary knob, software control, incremental push button, etc. but the functionality will be the same). The center position of the VRA/AutoVRA control will provide the user with the original mix where voice and remaining audio are approximately equal. As the knob is gradually moved to the left the voice level does not change but the remaining audio begins lowering, but has not engaged the hold function. At some predetermined distance away from the dead center condition (where N is equal to that condition and may be as small as zero if desired) the value to which the standard deviation is compared begins decreasing with movement of the knob, i.e. compression of the remaining audio begins. This continues until the stored standard deviation (changing with knob movement) becomes so small that the division results in a number that is near zero and the output of the multiplication is essentially zero and there is only voice. The reverse occurs with the remaining audio at the other end of the knob.

Figure 13:
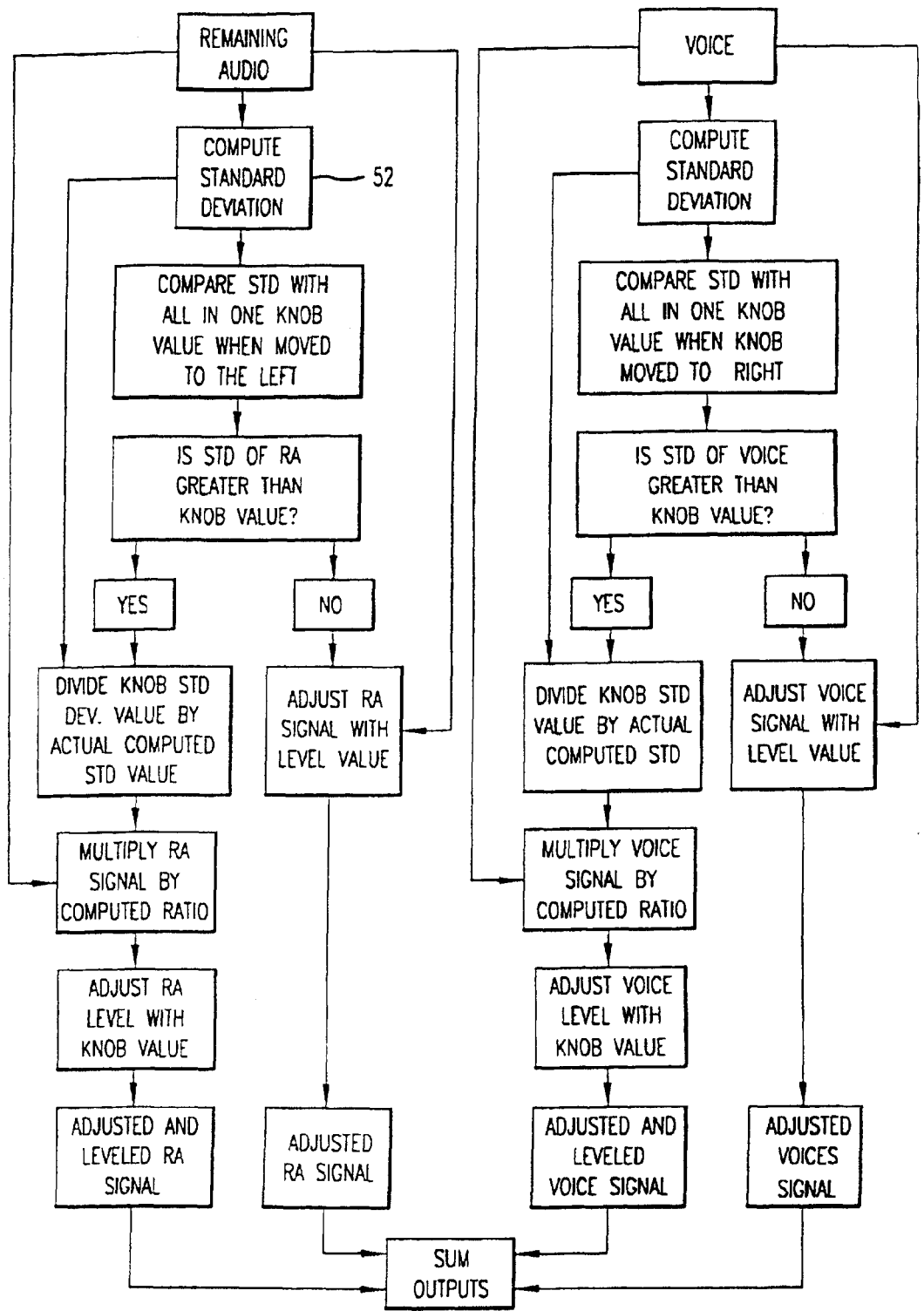
FIG. 13 illustrates a flow diagram of the various functions of the slide control.

FIG. 13 illustrates the block diagram of the all-in-one knob shown in FIG. 12. The knob controls the stored value of the standard deviation of the remaining audio after the knob reaches the point N at the left side of the dial. Likewise the stored standard deviation of the voice is adjusted by moving the knob to the far right. One possible alternative to the embodiment shown in FIG. 13 is to eliminate the voice AutoVRA control thereby only lowering the actual level of the voice as the knob moves to the left. (The argument for such an embodiment is presented in preceding paragraphs). Referring to the block diagram in FIG. 13, the remaining audio standard deviation is computed 52 and compared 53 with the stored remaining audio standard deviation 56 that is controlled by movement of the knob 57 position to the left past the point N. If the actual standard deviation exceeds the stored standard deviation then the remaining audio is multiplied by the stored value and divided by the actual value before it is modified by the volume level of the remaining audio 55 also controlled by the main knob 57. If it is not greater then the remaining audio is simply multiplied by the current knob setting 55 before being combined with the adjusted voice. As the knob is moved further to the right the same operations occur with the voice track. This single knob adjustment is particularly useful in applications where space is an issue such as a headset or hearing aid. This allows all the functionality of multiple controls but only the single knob is needed to affect all of the adjustments.

Further VRA Consumer Applications

Other VRA consumer applications may include:
- A portable "belt box" that receives and transmits an adjusted and/or controlled signal to an acoustic transducer
- A retrofittable device used to facilitate VRA adjustment for airline in-flight movies
- A separate audio decoder that can be used in conjunction with existing home theater hardware to provide additional VRA adjustments for multi-user applications
- Headphone VRA adjustments, remote commander with VRA adjustment capability VRA hardware has been designed specifically for providing the VRA adjustment capability whereas the descriptions in the following section explain how the VRA hardware can be integrated into existing audio reproduction hardware. This, however, does not limit the hardware described in this section from being used in conjunction with existing audio reproduction hardware. In fact, as will be seen, the VRA specific hardware has been designed to interface specifically with existing audio reproduction hardware such as a television or home theater system. It should also be noted that each of the specific embodiments discussed in the preceding section can be directly applied to each of the inventions discussed in this section to form a new user friendly invention for adjusting the VRA ratio. For example, the first invention discussed in this section will be a portable electronic component that can receive two (or more signals) one being voice and the others being remaining audio, combine and adjust those signals, and retransmit them to, for example, an inconspicuous headset, ALD, hearing aid, earphone, cochlear implant, eyewear or headwear incorporating speakers. The single knob invention discussed in the previous section and detailed in FIG. 9 could be included in this portable component to provide the end user with a single adjustment capability in a portable format. However, each of the respective combinations of technologies will not, by way of example, be discussed in detail but rather inferred from the description of the VRA methodologies described above by way of example (operating on two signals) combined with VRA hardware that receives two signals.

Portable Voice-to-Remaining Audio (PVRA) Devices

As used herein, PVRA refers to portable VRA devices used in a variety of environments in conjunction with standard PLD's (personal listening devices such as, by way of examples, headsets, hearing aids, cochlear implants and eyewear or headwear incorporating speakers, etc.). The PVRA device is capable of receiving wireless (or wired) transmissions by way of example from a source that is providing at least two signals, one of which is pure or mostly pure dialog and the other is remaining audio. (More channels may also be included for further spatial positioning capability as described in the previous section). The transmission 58 in FIG. 14 may be standardized to a certain bandwidth and low power so that the PVRA device 59 can be used in a variety of environments. This bandwidth might be 900 MHz for radio transmission or may be standardized as a line of sight infrared type of transmission. Once providers agree on a standard wireless transmission format, venues such as churches and movies may transmit the voice and remaining audio into the audience. The PVRA can be a universal player, designed to receive 60 these signals, adjust the voice 61, 68 separately from the remaining audio 62, 69, combine them to form a total content program 64, 70, and retransmit them 63 via a wired or wireless connection to the PLD 67 having a receiver 65 and a transducer 66 for converting the signal into audible sound. The methods for adjustment are described in detail in the previous section and include variable gain amplifiers or attenuators, and may also include the AutoVRA hold capability. The PVRA box can become a standardized component to work with many existing PLD's by incorporating, by way of example, a one-fourth inch stereo headphone jack at the transmit stage 63. This embodiment may also require a headphone amplifier in the PVRA device. Additionally, by way of example, a standardized plug for connecting a wired hearing aid to the PVRA can also be included. In order to standardize the PVRA with home theater equipment, all that is needed is a stereo transmitter where one channel is the voice and the other is the remaining audio and the receiver is tuned to receive the two signals.

Figure 15:
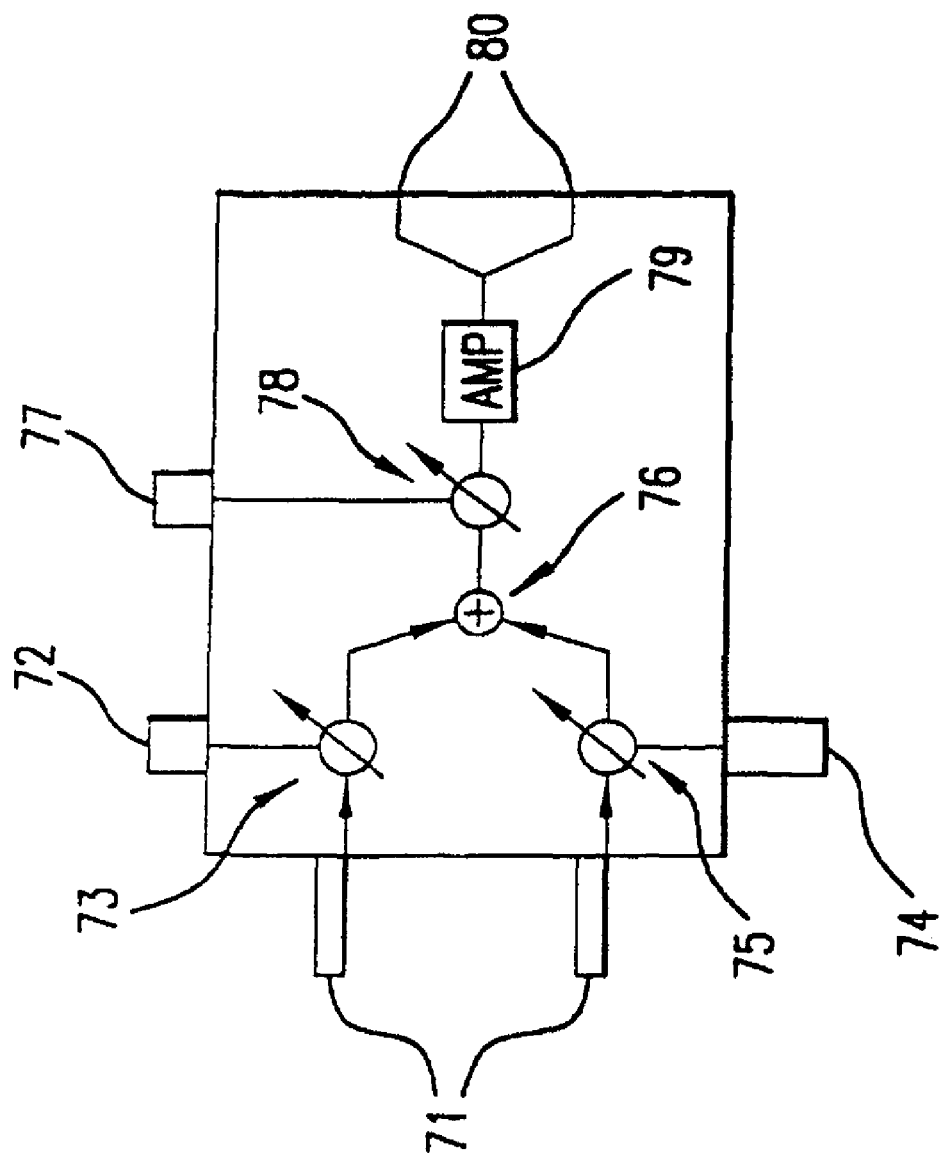
FIG. 15 illustrates an alternative embodiment of the present invention.
Figure 16:
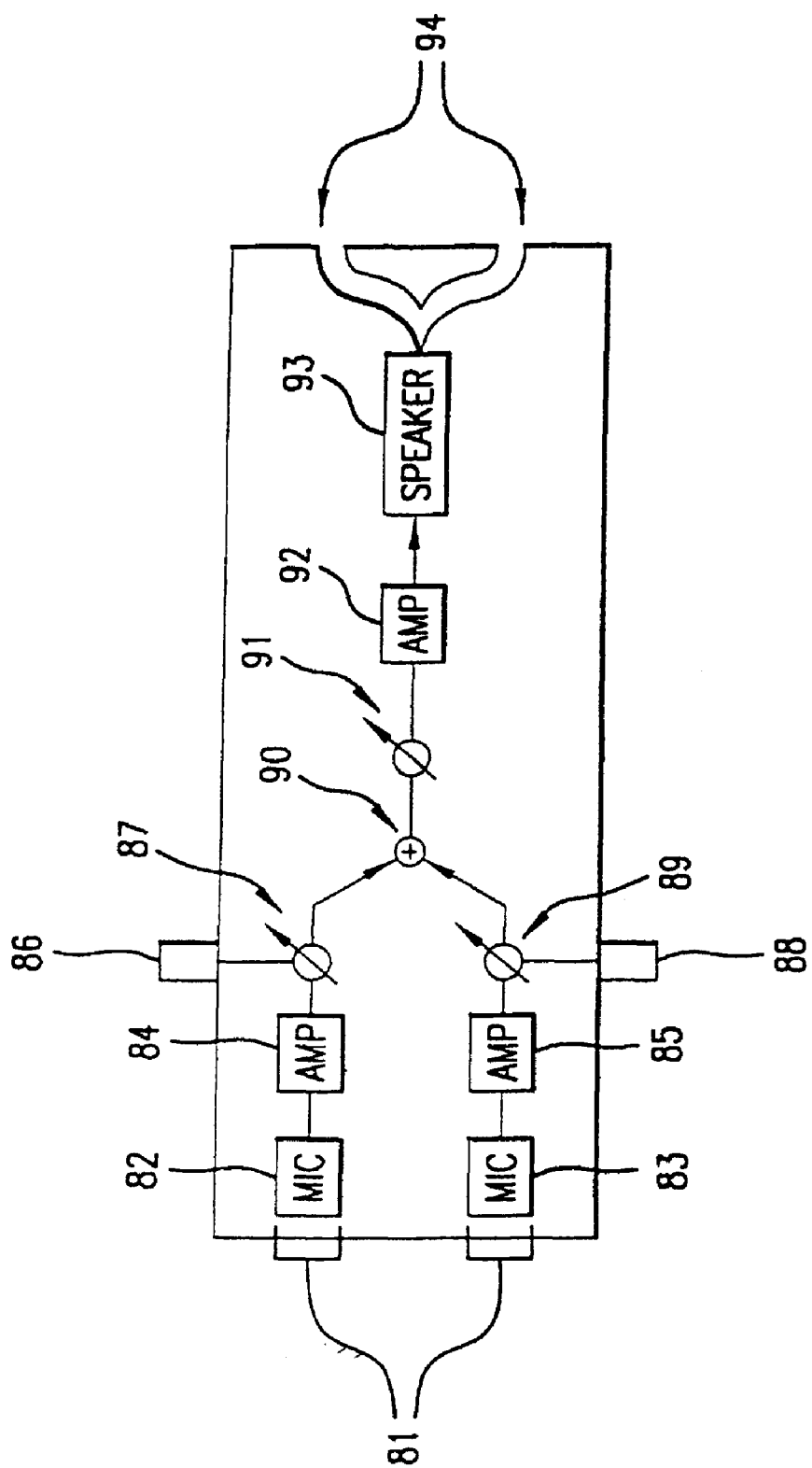
FIG. 16 illustrates an airline VRA adjustment box according to an embodiment of the present invention.

As a subset of the above description of the PVRA device, another device disclosed herein is a VRA/AutoVRA adjustment intended for use in conjunction with airline in-flight movie viewing. Dialog intelligibility can be particularly poor with in-flight movies where the background noise from the airplane further obscures the movie dialog. By providing the end user with the ability to adjust the voice and remaining audio separately, improved intelligibility can be realized during in flight entertainment. It is possible to achieve this goal without interfering with the existing infrastructure for audio transmission. We must assume that the audio source (VCR, DVD, broadcast, or other audio source) has a dialog track separate from the remaining audio track or tracks. This can be accomplished in several ways, one of which is by using the center channel on multi-channel formats or alternatively using a pure voice track that may exist in several audio compression standards. (Generating the pure voice track is not the focus of this particular invention, but rather the hardware and implementation used to adjust it and deliver it to the end user). The airline audio deliver infrastructure includes a stereo (2-channel) path to the end user which is implemented via either: 1) an electronic transfer of information to the armrest of every chair (requiring standard headphones with an airline standard connector); or 2) a waveguide system where there are tiny speakers in the armrest that when connected to a plastic tube, will transmit sound to the user's ears. To implement the retrofit airline VRA armrest adjustment device, it is necessary to assume that the voice is sent on either the left or right channel while the remaining audio is sent on the other channel, to all the armrests in the airplane. While this will remove the stereo effect, it is viewed as a minor sacrifice given the potential improvement in overall program enjoyment. In addition, the airline noise will often mask the subtle stereo effects during in flight entertainment. Since the electronic versus waveguide methods are so different, two different embodiments are required and are shown in FIGS. 15 and 16. However, if it is desired to make a universal adjustment mechanism, the components of FIGS. 15 and 16 can be combined into a single hardware unit that will perform in conjunction with any airline armrest.

FIG. 15 is an illustration of the version of the airline box that can be used for the electronic connections in the airline armrests. Plugs 71, for example, may be standardized male plugs, designed to fit into the armrest connecting to the left and right signal sent from the central location. These signals are then adjusted 72, 73, and 74, 75 to achieve the preferred VRA ratio from the voice (left) and remaining audio (right). These adjusted signals are then combined to form the total audio program and further adjusted by 77 and 78. An amplifier 79 is required to power the transducers in the PLD. The outputs 80 of the airline VRA box consist of connectors, for example, mating female connects, that exist in the current armrests so as to allow the airlines to use their existing headsets for the PLD device.

FIG. 16 illustrates the airline VRA adjustment box that can be used in conjunction with the waveguides in the existing armrests. In order to adjust the levels of each of the two signals (voice and remaining audio), it is necessary to convert the signals back into electronic format. Two microphones 82, 83 and microphone amplifiers 84, 85 are located in the device which measure the output of the armrest speakers that normally drive the waveguides. The output of the amplifiers represents an electronic signal that is the voice or remaining audio. These signals are independently adjusted via 86, 87 and 88, 89 and a total signal is created 90. This is further adjusted for overall level 91, 92 and used to drive another speaker 93. A waveguide and output jacks 94 identical to those in the armrest represent the output of the airline VRA box so that the standard waveguide style headphones can be used in conjunction with this design.

Wireless Transmitter in DVD, Television, etc. to Transmit Two Signals

Figure 17:
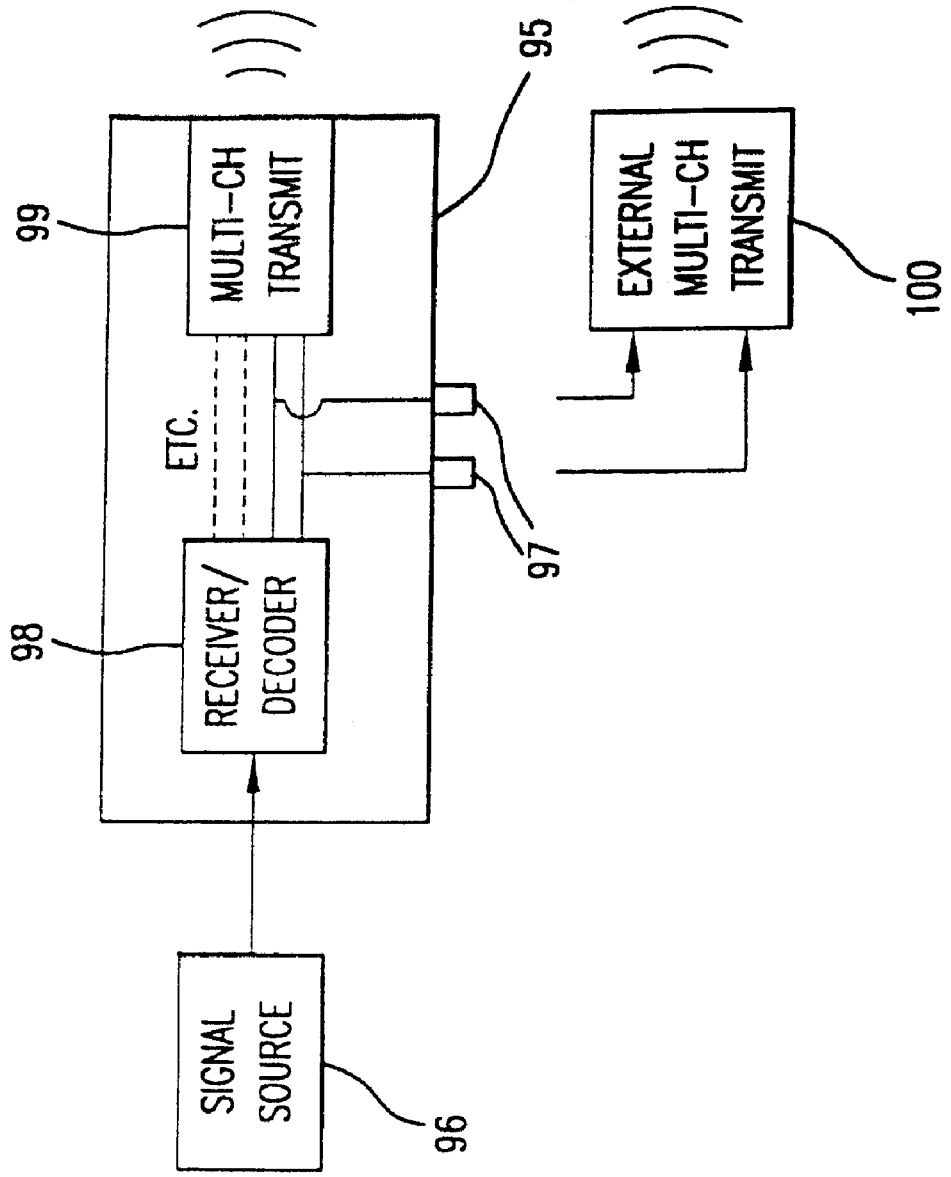
FIG. 17 illustrates an alternative embodiment of the present invention.

Another application for multi-user VRA adjustment arises when home theaters as well as home television and movie viewing are considered. Often times there are multiple viewers in a single room with different listening preferences for varying voice to remaining audio ratios. This invention allows multiple signals to be made available to PLD's worn by multiple users so that each individual can adjust the VRA (and AutoVRA) to his liking. As before, by way of example, the audio source (television broadcast, DVD player, etc.) contains at least one track that can be considered as pure voice or mostly voice along with at least one track that is considered to contain remaining audio. (Different audio standards and formats may support some form of a pure voice track in the future). What is anticipated by this invention is the need for multiple users in the same listening environment to access the at least two audio signals separately and simultaneously to allow them to set the ratio for their own personal listening pleasure. In the first and most preferred embodiment (for space and cost considerations) a multi channel wireless transmitter is located inside the audio reproduction hardware (such as a television or DVD player) that sends separately the voice and remaining audio signals into the audience so listeners with VRA capable PLD's that can receive the transmission can adjust the VRA independently. In addition to locating a wireless transmitter inside the audio reproduction device, separate audio output jacks can be made available that provide access to the remaining audio (either mono or multi-channel) and the pure voice (mono or multi-channel) for the purpose of wired adjustment by a separate PLD without the wireless reception capability. In the case where the audio jacks are available without a wireless transmitter in the television set, DVD player, or other device, the user can connect a separate multi-channel wireless transmitter to those output jacks to make the separate audio signals available to the audience. FIG. 17 illustrates these concepts. The signal source 96 will deliver a coded or modulated version of the entire program which may also include video information if applicable. Signal sources might include, by way of example, a television broadcast signal (over satellite, cable, terrestrial) and a coded DVD or CD signal read by the laser. This information must be received and decoded before it becomes electrical signals that represent the audio information. The decoder will be capable of extracting the pure voice channel(s) (if it exists in the signal source) and keeping it (them) separate from the remaining audio channel(s). After the receiving/decoding stage 98, there are two options available for the separate voice and remaining audio signals 1) they can be made available through separate output audio jacks 97 (such as phono type connectors) or they can be sent to a multi-channel wireless transmitter 99 that is also housed in the playback device 95. The playback device 95 might be a DVD player where the signal source is internal to the device or a television where the source is external. If the signals are made available as hardware outputs, a separate external multi-channel transmitter 100 that is capable of interfacing to a receiving PLD can be attached to these outputs to provide wireless reception and VRA adjustment at the PLD location for all users in the same listening environment.

Additional VRA Decoder for Use with Other Systems That Are Not VRA Compatible

Figure 18:
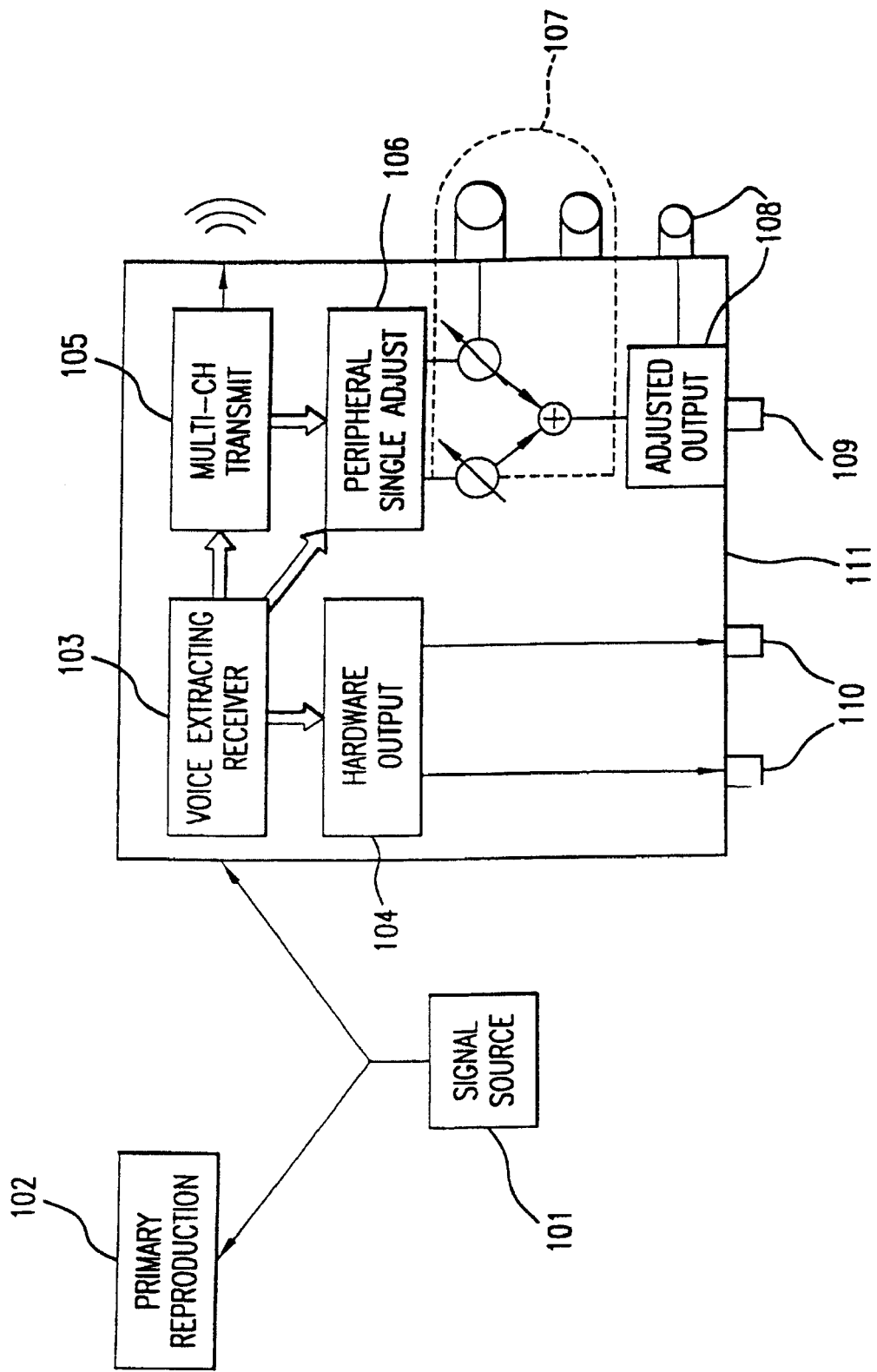
FIG. 18 illustrates an alternative embodiment of the present invention.

As an alternative embodiment, it is also possible to have a dedicated decoder specifically designed for VRA applications. This will allow users who do not currently own a VRA capable decoder/transmitter to still access the VRA capability without upgrading any specific component (i.e. without losing their current investment). Suppose DVD's or broadcast TV or broadcast radio begins transmitting an encoded pure voice channel. Current reception devices will not only be incapable of receiving and extracting that information but will also be incapable of providing the VRA feature to any individual, let alone multiple users in the same environment. The device 111 shown in FIG. 18 will provide all of these capabilities for the user who has available to him the signal sources with the voice separate but not the means to extract and adjust the VRA ratio. The signal source 101 may be as before (television broadcast, DVD information, etc.) and can be transmitted directly to the primary reproduction system 102 which would be the TV or DVD player that cannot provide the VRA adjustment because it was originally not equipped with this feature. The same signal source is "T'd off" to the external VRA box 111 where the appropriate receiver or decoder has been installed to remove and separate the voice and audio components from the signal source according to the standard that supports that type of data present in the signal. Such a decoder might be a Dolby Digital decoder capable of extracting the hearing impaired mode but this invention is certainly not limited to that particular decoder. Other popular audio formats may someday provide a means to transmit a pure vocal track in addition to the existing audio. This invention herein 111 will incorporate the appropriate decoder depending on the desired application. There are then three options for the external device after it has decoded and separated the vocal track from the remaining audio tracks. First, the device can provide hardware outputs 104, 110 in the form of audio jacks such as RCA type or phono connectors that can provide a line level signal to a transmitter or wired PLD capable of VRA adjustment; second, the receiver can provide a multi-channel transmitter 105 with the separate voice and remaining audio signal(s) for wireless transmission to a PLD capable of VRA adjustment; or third provide the VRA adjustment for a single user application 107 directly on the device where the voice and remaining audio are separately adjusted, summed together and further adjusted for total volume level 108 before being provided as output(s) 109 to any other audio playback component. It should be noted that although only a single adjusted output is shown in FIG. 18 (implying a total mono signal output) it is not beyond the scope of this invention (as mentioned in previous descriptions) to provide several outputs for multi-channel spatial positioning of the audio. For example, if a 5 channel remaining audio program (left, center, right, left surround, and right surround) were available along with a 5 channel (or fewer) voice audio program, these could be combined after level adjusted so that the voice could be placed on any speaker by using separate volume adjustment, or directly to the center speaker (typical). This still provides the end user with VRA adjustment capability while also providing an immersive surround sound experience.

Reception and VRA to be used in Conjunction with Existing Wireless Transmission of Mixed (Video and Audio) DVD Signals A new class of products is emerging that allows consumers to enjoy DVD video and audio from remote locations. This wireless technology delivers the audio and video information from a remote DVD player to a television or home theater. This allows owners of a DVD drive in their personal computer to use that drive to view the content of DVD's at locations other than their computer. The VRA adjustment at the PLD location as well as at the centralized home theater can be used in conjunction with the wireless DVD technology in two ways. First, since the DVD player is already sending wireless audio signals to the home theater system, the PLD can be equipped with a wireless receiver set to the same frequency so the PLD can intercept the same transmission. Since the video information is only needed at the viewing location and not at the PLD, the audio can be selectively decoded at the PLD for reproduction. It is important to note that the receiving process of the wireless signal will be followed by the decoding process to extract the voice and remaining audio from the wireless DVD signal. Following that the adjustment, recombination and transduction of the signal to audible sound occurs, with full adjustment of the voice level, remaining audio level, total level, and any AutoVRA features also included. All hardware mentioned above will be located in the personal listening device so each user can adjust the VRA and level to his/her liking; such a system is depicted in FIG. 4 where the transmitter is sending the entire DVD signal but the PLD decoder is designed only to extract the audio from the incoming bitstream.

There is a second embodiment of the VRA used in conjunction with wireless DVD transmission that may result in a lowered overall cost but an increase in the number of required components. As before, the total DVD signal is transmitted from the DVD player to the playback location, a home theater for example. The receiver of the total DVD signal at the centralized home theater location can then retransmit only the voice and remaining audio to achieve an embodiment similar to that which is shown in FIG. 4 but different in that the transceiver is receiving the wireless signal from the wireless DVD transmitter at the centralized location. This allows multiple PLD's in the same location to be equipped with only a wireless receiver and not a digital decoder. The decoding process is performed centrally at the home theater location with the video being sent to the viewing device and the audio (having been received from the DVD player location and decoded) being retransmitted from the receiver, decoder, transmitter, to the PLD's receiving the voice and remaining audio.

VRA Knob on Headset Cup

Figure 19:
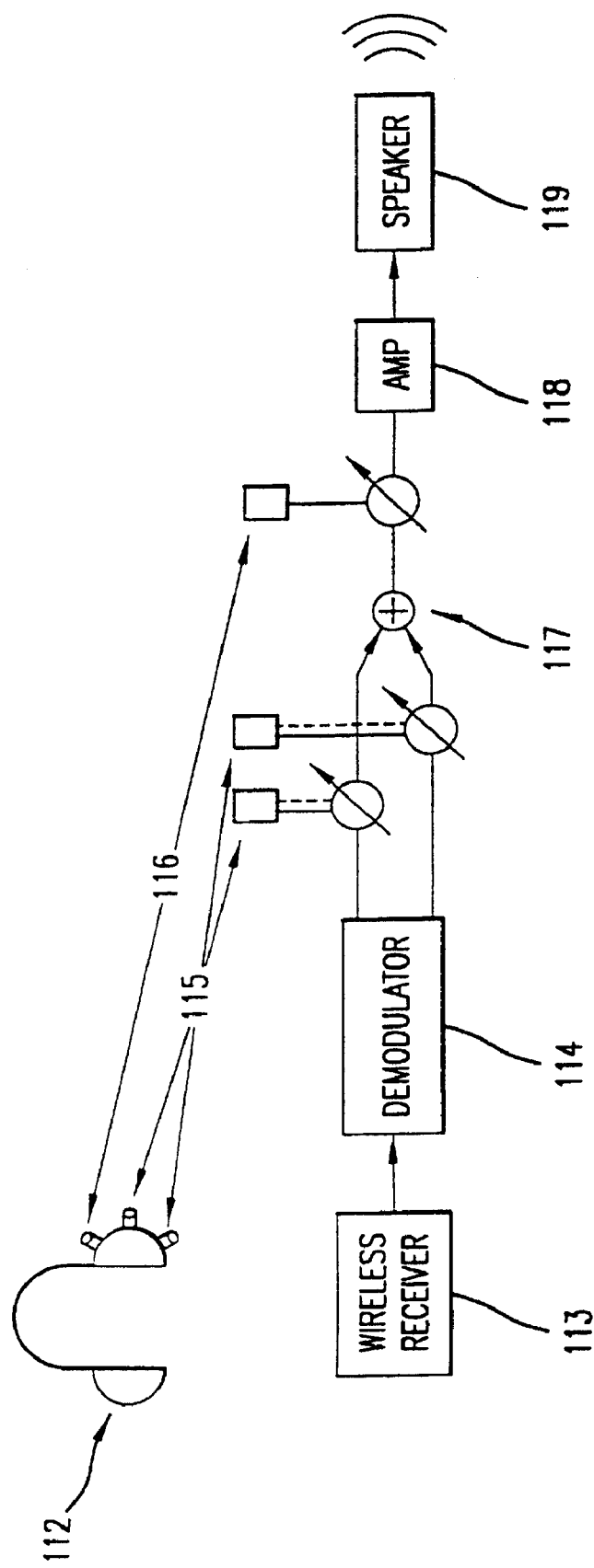
FIG. 19 illustrates a headset configuration according to an embodiment of the present invention.

The next class of inventions discussed focuses on incorporating the VRA adjustment features into specific hardware designed for VRA applications, namely personal listening devices with VRA capability. There are three classes of PLD's that are the focus of this embodiment and they are the headset, hearing aid, assistive listening device, cochlear implants, eyewear, headwear incorporating speakers utilizing wired or wireless technology. In general an assistive listening device utilizes a headset in conjunction with a type of microphone or wireless transmitter, depending on the purpose of the product. In some sense, the wireless VRA system itself shown in FIG. 4 might be considered as an assistive listening device. But in general the VRA technology of receiving, separating, adjusting, recombining and delivering can be used in products besides ALD's. A wireless headset, headphones or earbuds might include volume controls directly on the side of the headset itself. FIG. 19 illustrates such an embodiment where all the necessary hardware is located in the headset 112 itself and the necessary adjustments for VRA control are easily available to the end user on the external housing of the earcup. First the wireless receiver 113 receives the multiple audio signals transmitted from the source location after decoding occurs (if required). The demodulator 114 basebands the audio signals resulting in a vocal track(s) and a remaining audio track(s) that are then manually adjustable 115, summed 117, and further adjusted for level 116, amplified by the headphone amplifier 118 and reproduced through the headphone speaker 119. The volume knobs 115, 116 can be located on the external portion of the headset and can be accompanied by a balance adjustment if multi-channel (stereo) reproduction is used. If multiple channels of audio are transmitted and received at the PLD, they can be adjusted and combined to form the need stereo image or spatial projection by incorporating the hardware and software shown in FIG. 5 and/or 8.

Remote Control Adjustment of VRA in a Hearing Aid

In addition to VRA adjustment carried out on a headphone device that is physically large enough to accommodate the aforementioned hardware, it may also be desirable to allow VRA adjustment in smaller PLD's including hearing aids or smaller headphone devices. These smaller PLD's may not be able to accommodate all of the needed hardware for adjusting and manually controlling the levels of the two or more signals. In this case it may be more desirable to use a device such as that described by FIG. 13. With this embodiment used with a small PLD, only the wireless receiver in the PLD is needed. Surface mount technology and miniaturization of electronic components facilitates incorporating a low power wireless receiver into small spaces. (Note that less antenna amplifier power is required because the transmission of the adjusted signal only needs about a five foot range because the handheld adjustment mechanism is receiving the split signals from the source transmission location). The remote transceiver described by FIG. 13 can also be constructed in the form of a remote controller for the PLD. Therefore the remote controller controls the volume of the voice and the remaining audio and the total volume of the PLD as well as acting as a transmitter to the PLD and a receiver from the source location. Future technology may permit the entire set of electronics needed for adjustment of the VRA, by way of example, in the hearing aid (or miniaturized PLD itself). It still may be necessary to use a remote controller to actually control the volume levels since it is desirable to keep hearing aids as inconspicuous as possible. In this case a remote controller may be desirable for aesthetic reasons.

Embodiments for VRA Headphones in Movie Theater Environment

Movie theaters offer yet another opportunity for individual adjustment of the VRA, provided the headset design is equipped with the technology disclosed herein. Individuals can take advantage of the ability to control the voice level independently of the remaining audio while enjoying the surround sound or large screen of a movie theater. It is desirable to have full control over the remaining audio and voice in a movie theater assistive listening device or headset, a circumaural headset with sufficient passive and or active control is needed. The passive noise control via circumaural cushions, double cup designs and damping material is effective at blocking ambient frequencies down to approximately 500 Hz. It may also be desirable to incorporate active noise control into such a headset for further reduction of lower frequencies that are not effectively controlled by passive measures. Such a theater headset can be designed as discussed in previous headset embodiments. A second alternative for slightly reduced functionality is available if control over only the vocals is required. Many movies are mastered such that the voice levels are too low to provide good intelligibility during loud segments of the remaining audio. It may be desirable to raise the dialog only level during these segments. The reception, volume control, and reproduction of the dialog only signal can be accomplished using a non-circumaural headset that allows ambient sound to reach the ears. Allowing the ambient sound to reach the users ears allows spatial cues from multi-channel surround sound to still arrive at the ears and be heard but the dialog can be adjusted for improved intelligibility.

It should be recognized that the adjustment of the voice to remaining audio (VRA) ratio (a component of the mixing process at the production end of professional recordings) may interfere with some individual's concepts of artistic freedom. Audio engineers for instance focus heavily on obtaining the right mix of sounds to generate the desired effect in music, film and television. Therefore it is necessary to include a means for either transmitting the original (unaffected) production level mixture of the total program or providing a means to easily arrive at that mixture. This allows the end user to choose between the ability to select the production mixture (the way that the producers designed the mix) or to adjust the VRA ratio themselves. There are at least four possibilities for accomplishing this goal and they are presented next.

Embodiments for Selection of VRA versus Artistic Mix (Original Audio Mix)

Method 1

Figure 20:
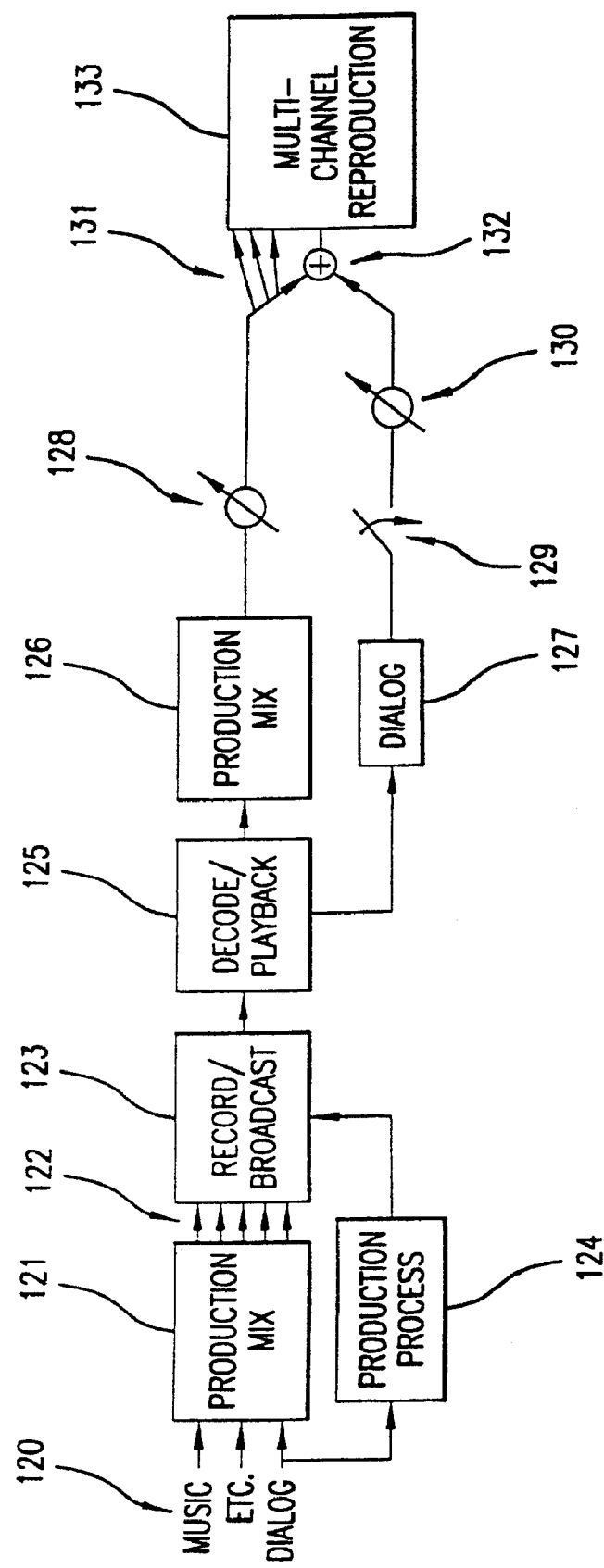
FIG. 20 illustrates an embodiment for retaining delivery of a production mix to and end user in addition to providing VRA adjustment capability according to the principles of the present invention.

FIG. 20 presents the first two options for retaining delivery of the production mix (the mix designed as the producers intended it) to the end user in addition to providing the VRA adjustment capability. The producer begins with separate tracks 120 of all the elements that make an entire program and combine them 121 together to form a mono or multi-channel program 122 that is recorded or broadcast 123 toward the end user. In addition to the production mix, the voice (time aligned, delayed, and processed 124 with the same processing as 121) that is used to create the production mix should be kept separate from the production mix through the recording and broadcast stages 123. Typically a signal is broadcast at a single frequency with a certain bandwidth therefore it is often represented as a single signal as shown in FIG. 20 as the input to 126. (Even though this is shown as a single signal, multiple signals are contained in the modulated/coded signal). Decoder/playback device 125 decodes or demodulates the recording or transmission to provide the original production mix 126 in addition to the dialog only track 127 that was produced and recorded in conjunction with the production level mix. The dialog signal is passed through a switch 129 that can disconnect the dialog signal from the output 133 altogether. When this switch is opened the production mix in its original form is available for playback through the reproduction hardware 133 in any multi-channel configuration 131 that it was originally produced in, and the volume knob 128 acts as a total volume control for the entire program. However, when the switch 129 is closed, the dialog is passed through the volume adjustment 130 and added 132 to the production mix (if it is a multi-channel format it will typically be added to the center or equally to the left and right channels). This allows the end user to adjust the level of the total program 128 with respect to the level of the dialog 130. If the dialog volume knob 130 is turned down completely, the production mix is again available. If the dialog in the production mix and the separate dialog track are recorded or broadcast simultaneously (i.e. time aligned) there will be no delay between the two tracks; therefore, as the volume of the dialogue is increased in combination with the production mix, it begins to raise the voice to remaining audio ratio as heard through the reproduction system 133. Time alignment may occur by processing the dialog signal with all of the same delay causing elements (such as reverberation or filtering) that the dialog in the production mix experiences. This will ensure that both the dialog in the production mix and the separate dialog track line up identically in time. It should be noted that this particular embodiment does not permit achieving VRA ratios that are below the production mix VRA ratio. If this is a desirable feature, the next two inventions will accomplish that goal.

Method 2

Figure 21:
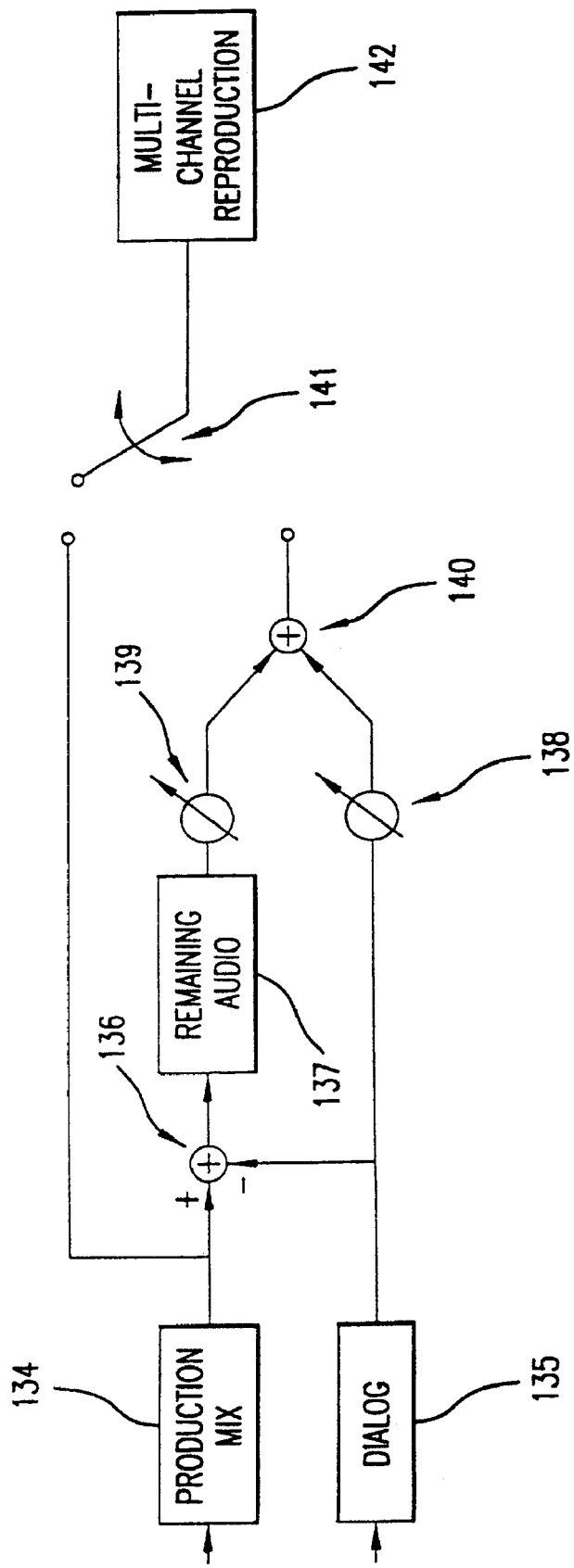
FIG. 21 illustrates an alternative embodiment of FIG. 20.

As before it is assumed that both the production mix and the dialog are available from the broadcast or recording and that both dialog signals (one in production mix and one pure) are time aligned with respect to each other. FIG. 21 shows an alternate configuration for following the decoding of the production mix and the dialog channel that will allow negative VRA ratios (i.e. for the user to lower the voice level and raise the remaining audio level if desired). The decoded dialog signal 135 is subtracted 136 from the production mix 121 resulting in a purely remaining audio 137 mix. At this point it is possible to adjust the remaining audio level 139 independently of the dialog level 138 before combining 140 to form the total user adjusted program. The production mix is made available as one pole of the switch 141 that alters the selection between the user adjusted mix and the production mix. This configuration allows for the lowering of the dialog signal to the point that only remaining audio is left. The next invention also provides a fully user adjustable VRA ratio with the availability of a production level mix by recording production information before the encoding process.

Method 3

Figure 22:
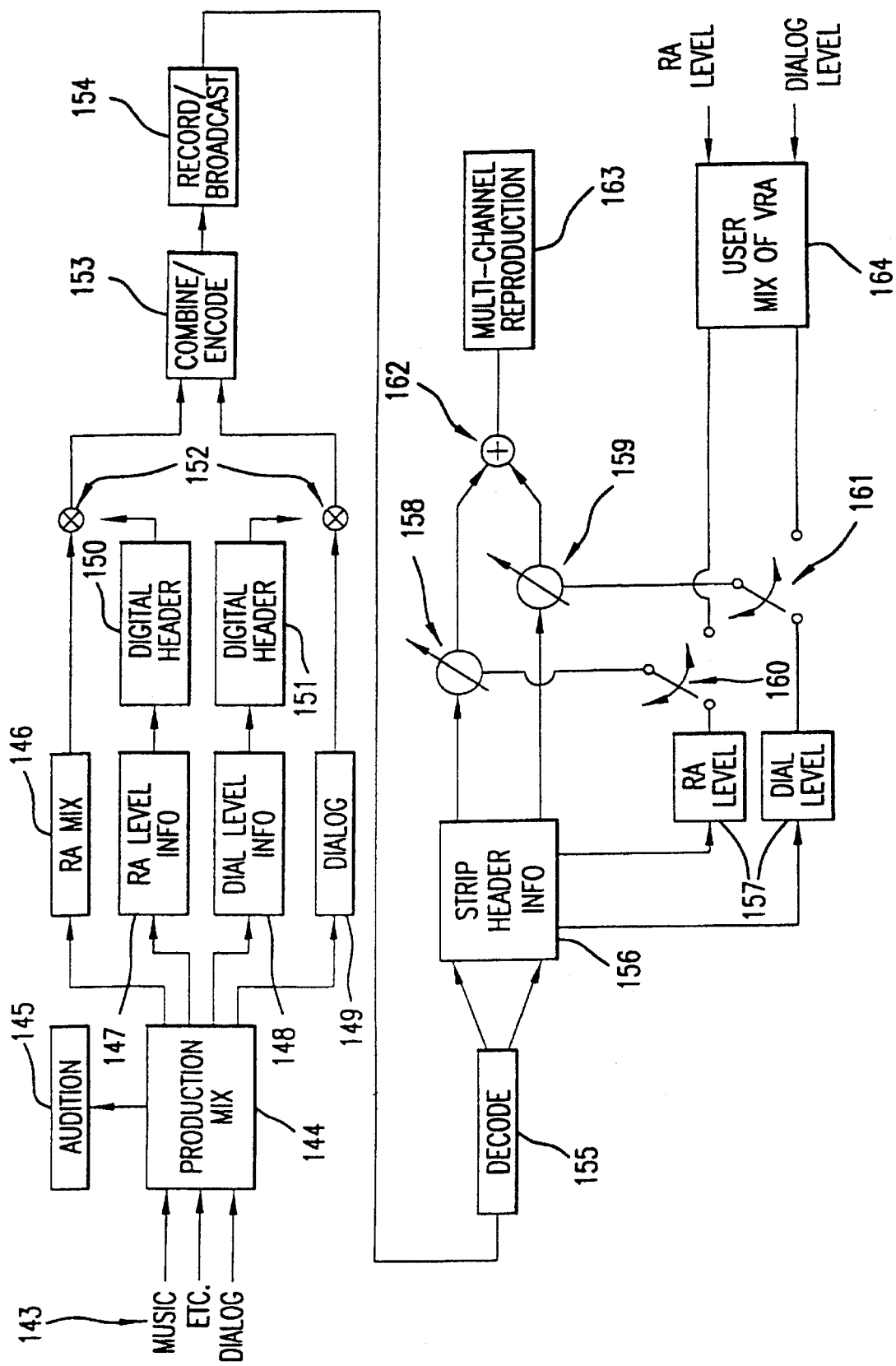
FIG. 22 illustrates a production process according to an embodiment of the present invention.

FIG. 22 illustrates a production process that transmits information about the way a program was mixed to ensure that the production mix is available at the consumer level as well as providing the capability to adjust the VRA ratio universally. The original program elements 143 are mixed 144 to form a multi-channel or mono program that is continually auditioned until the levels of all inputs 143 are correct for accurate reproduction as determined by the audio engineer producing the program. The outputs of the production mix are then designed to be the dialog signal by itself 149, the level that the producer determined was appropriate for the dialog signal 148, all combined audio that is not considered to be critical dialog 146, and the overall level of that remaining audio. The respective level information is digitally encoded 150, 151 as metadata into the actual audio signals themselves 152, 153. These encoded signals with their respective level information are transmitted, broadcast, or recorded 154. The playback device is equipped with a decoder 155 that extracts the audio information as well as the header information 156 containing the original production mix levels (possibly with respect to some digital full scale value depending on the resolution of the recording). The remaining audio level and dialog level 157 can be provided to the gain adjustment circuits 158 and 159 so that the levels are correct and the original production mix is realized upon combination 162 of the automatically adjusted dialog and remaining audio. This can only occur if the switch (or switches) 160 and 161 connect the output of the header information block 156 to the gain adjustment circuits. If the switch (or switches) is thrown to the right position connecting the user mix of VRA 164 then the user selects the remaining audio level 158 and the dialog level 159. Although the paths shown indicate single signals in many cases, it is well within the scope of this invention to view each signal path as a vector where multiple signals are present, such as left, right, left surround, right surround, and center channels for spatial positioning, whose levels are all controlled by the remaining audio level control of 158 in FIG. 22. Likewise the pure voice track may also consist of multi-channel information which can be adjusted by the control 159.

VRA in Conjunction with Existing Audio Reproduction Hardware

The above discussion focused on providing the end user with the ability to adjust the VRA of electronically reproduced media (either broadcast playback or recording playback) on personal listening devices PLD's so that individual listeners in the same environment can enjoy different VRA ratios simultaneously. Further inventions are made when the personal listening devices described above are extended to include the following electronics:

Cellular telephones
    Wearable Computers
    Personal data assistants
    MP3 playback devices
    Personal audio players that use magnetic storage media to store the music These devices can be used for personal level playback of music or audio containing dialog and remaining audio that might obscure the dialog. The embodiments discussed in the previous sections can be applied to the four devices listed above to provide VRA adjustment for the playback of audio that has been prerecorded or produced with the dialog separate from the remaining audio regardless of the coding format.

VRA on Personal Computers

Figure 23:
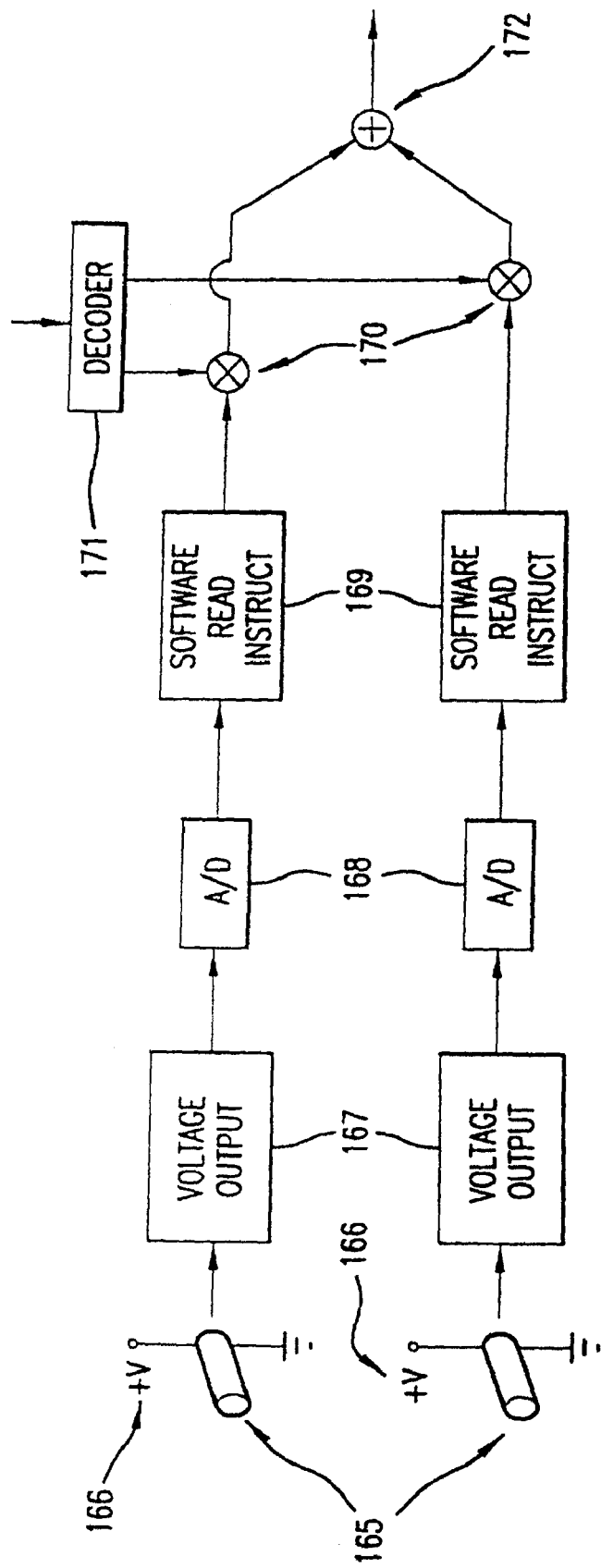
FIG. 23 illustrates alternative embodiment of the present invention.

The internet has become a popular avenue for the distribution of digital quality media. If consumers are receiving music, movies, or other audio in real time (or delayed) over a data connection to their personal computer, they can implement the VRA and AutoVRA features in a variety of ways. The control of the gains applied to the voice and remaining audio can be entirely software driven through a graphical user interface. The voice and remaining audio are decoded separately either through hardware or software, depending on the personal computer system. The signals can be amplified in the digital domain by incorporating several lines of source code into the decoding program that indicated that each of the two signals (voice and remaining audio) are to be multiplied by user adjustable constants. These constants are controlled by the user before the signals are summed together, through a software user interface that allows adjustment of the two constants being multiplied by the decoded voice and remaining audio signals. In addition a further volume adjustment may be applied to the overall combined level to allow the user to control the total volume of the program prior to playback. Alternatively, if it is desirable to provide the user with more "user friendly" adjustment capability, the VRA knob(s) (see methodologies discussion for possible control knob implementations) can be made available as actual hardware on computer speakers, keyboards, mice, or monitors, all components of the PC system. If the VRA adjustments are made available via hardware (as in a knob on the monitor) and the signal decoding is implemented via software, a handshake protocol is needed to ensure that the adjustments made using the hardware knob are translated to software gain change and multiplication operations. FIG. 23 illustrates one possible option for interfacing the hardware and software. The movement and location of the hardware knob(s) 165 generating a voltage output 167 relative to position and a full scale voltage 166 must be sampled via an A/D 168 to convert the position information into a number that represents the volume relative to full scale 166. One possible hardware implementation of such a knob is a rotary voltage divider which is a potentiometer with a full scale voltage at one terminal, a ground at the other, and the wiper provides the divided voltage as a function of rotary position. The output of the A/D is then polled periodically by the software 169 controlling the signal flow to read the digitized number the user has selected. These numbers (one for voice and one for remaining audio) are multiplied 170 by the respective signals and those outputs are summed 172 to form the total VRA adjusted program. There are several other combinations of using software and hardware for controlling the VRA on a personal computer playback device. The hardware only version requires that the signals are decoded and provided as outputs of a sound card or from the PC motherboard itself as in the device shown in FIG. 18. This implementation allows volume adjustment of two signal using hardware gain or attenuation without the need for a graphical user interface. Each configuration has its own advantages:

All hardware: inexpensive, knobs readily available and easy to adjust with high visibility
    All Software: no hardware upgrade required to implement VRA, greater flexibility for adjustment options and features, GUI controls can be customized by end user
    Software/Hardware: high visibility of adjustment mechanism fewer D/A converters required because the sum is output rather than the remaining audio and the dialog AutoVRA on Personal Computers It should also be noted that while the personal computer is considered to be a personal listening device, a headset (also a PLD) is often used in conjunction with the PC. Therefore the PC can act as the signal source for other PLD's. So previous embodiments discussing the television and DVD can also include signal sources on the PC such as, for example, a headphone jack with VRA controls connected to it. In addition, while the focus has been on the VRA adjustments alone, the AutoVRA hold feature can also be implemented on the PC. In fact, due to the computations required for computing of the real time signal properties, a central processing unit (CPU) or digital signal processor (DSP) capable of handling the large number of operations per second is required. Therefore the PC implementation of VRA facilitates the implementation of the AutoVRA features by virtue of the available computing power. All of the AutoVRA features and user controls discussed in the previous sections can be implemented using any of the hardware/software interface options discussed in the previous paragraph. However, a purely hardware implementation may be difficult given the required computing power and real time operations required to continually limit the signal levels. Therefore an implementation where either all software is used, or a combination of hardware controls and software mathematical operations will be preferred for the AutoVRA implementation.

Figure 24:
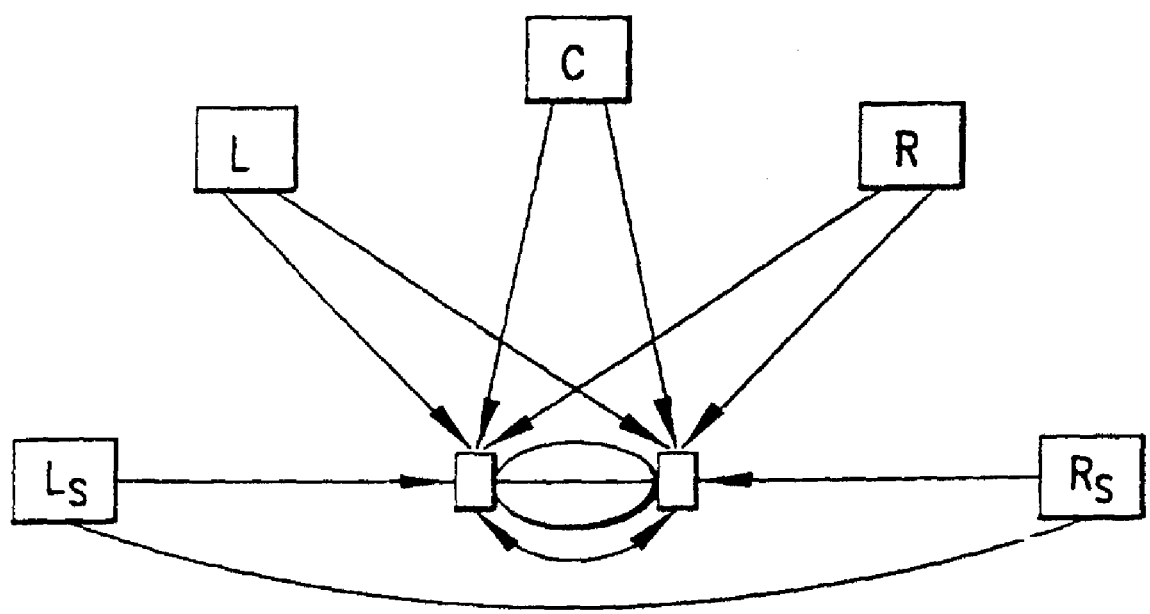
FIG. 24 illustrates a user in a multi-channel listening environment.

FIG. 24 illustrates a user in a multi-channel listening environment. Such an environment might have 2, 3, 4, 5 or more speakers although FIG. 24 shows the situation with 5 speakers, left, center, right, left surround, and right surround. Each speaker has a frequency response path from itself to each ear, creating a total of 10 paths. If the electrical signals that drive those speakers are filtered with estimates of those paths before being combined to form a left ear and right ear signal, a more realistic sound stage can be generated for headphone listening. This is clearly a desirable result that allows individuals to experience the multi-channel surround sound experience without purchasing a multi-channel amplifier/speaker system. However, an invention is needed to provide the end user with the ability to adjust the VRA in conjunction with the multi-channel spatial processing in order to achieve the desired intelligibility while experiencing the surround sound stage using headphones.

Figure 25:
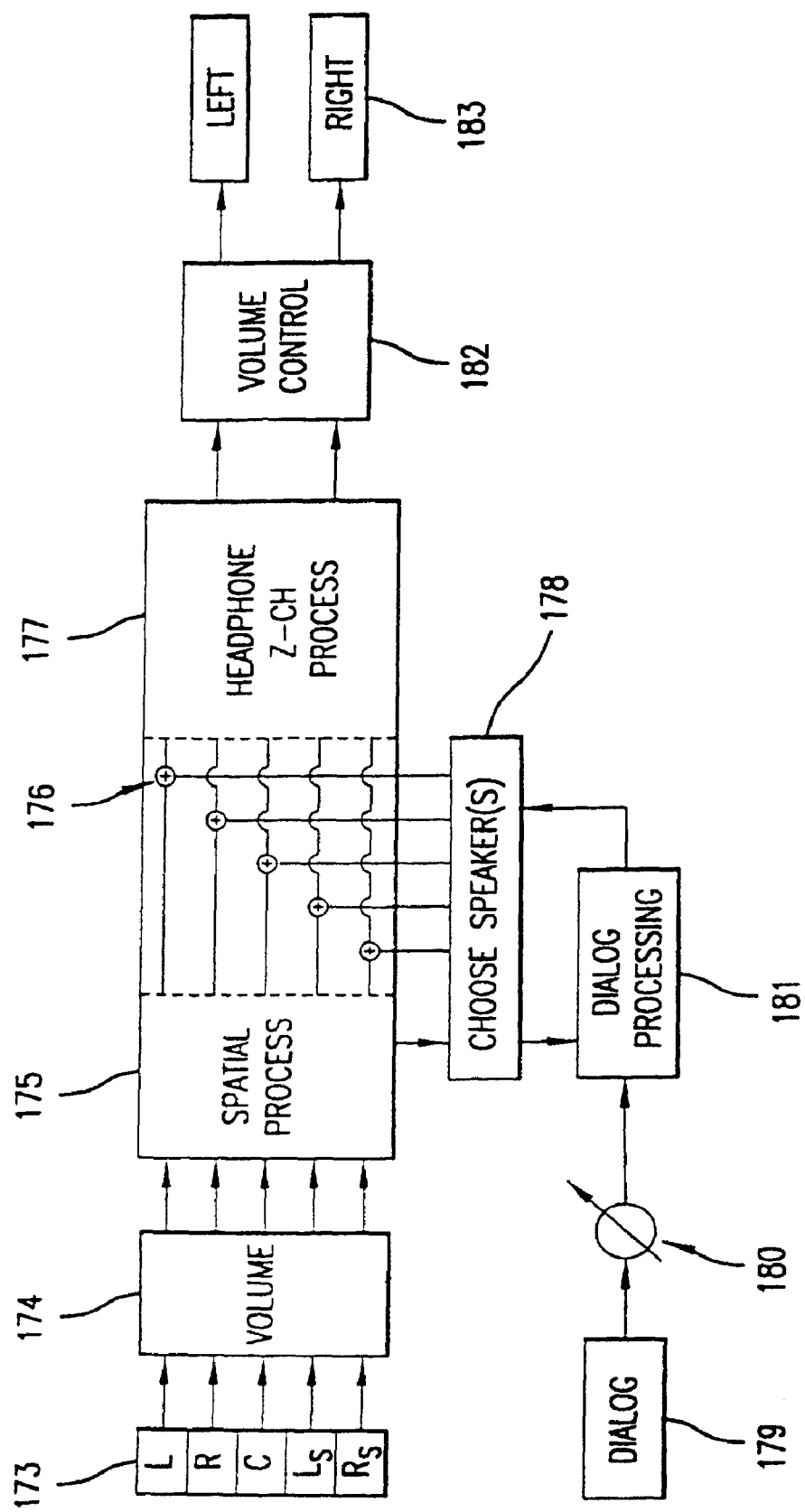
FIG. 25 illustrates VRA and AutoVRA on multi-channel processed headphones according to the principles of the present invention.

VRA and AutoVRA on Multi-Channel Processed Headphones—Used in Conjunction with Dolby Headphones The design described by FIG. 25 assumes that the dialog track is provided separately in addition to the total audio program. Therefore negative VRA ratios cannot be achieved with this particular embodiment. However, if two multi-channel programs were simultaneously decoded (remaining audio and voice) then all possible VRA ratios would be achievable by completely lowering or raising the remaining audio and/or voice. FIG. 25 shows the total multi-channel audio program (remaining audio plus voice) 173 being passed through an overall volume control 174 that will ultimately act as the remaining audio control. The spatial processing in 175 refers to the prior art where each of the signals are filtered and/or delayed to produce the desired multi-channel effect. However, before they are combined together to form the two channel headphone program, the altered dialog is added 176 to the appropriate channel(s). As a component of the spatial processing, information is retained as to which speaker the dialog track should appear on and that information is relayed to a decision making step 178. For most productions, speech resides either on the center channel or on the right and left channel simultaneously (phantom center). For this description it will be assumed that the dialog will be routed to the center channel only. When the center channel is indicated by 178 as the proper location for the dialog, the dialog processing 181 copies the spatial processing information (filter, delay time, etc.) for the channel that the dialog will be placed on. The dialog 179 is first adjusted for level (the voice level adjustment) 180 before being processed by the (center) channel processing 181 that was copied from the multi-channel spatial process 175. After the dialog has been processed 181, the speaker to which it will be applied is again referred to 178 and then the signal is added into the appropriate channel 176. If for example the voice was meant to be on the left and right channels, the 178 block would deliver the appropriately processed voice to each of those channels via 176 and not to any of the others. The remaining audio signal can be raised and lowered using 174 and the dialog can be raised and lowered using 180, providing positive VRA adjustments because the voice is included in the total program 173. The VRA adjusted, spatially processed, multi-channel program is then further processed (prior art) by 177 to generate a two channel headphone program. This two channel program is further adjusted for volume 182 and delivered to the headphone speakers 183. A recent implementation of the prior art discussed as elements 175 and 177 in FIG. 25 is the Dolby Headphones. The VRA invention above is designed to work in conjunction with the Dolby headphones as well as any other multi-channel processing headphone that derives two headphone channels from multiple spatial channels.

VRA on "Stored Program" Playback Devices

Nonlinear television viewing offers a significant advantage to viewers in that programs can be recorded and stored for later viewing. The newest technology, hard drive television recorders, (some companies include TiVo, Replay, and Microsoft) differs from conventional VCR technology in that the recording methods are much more user friendly, separate recorded channels can be set up and playback is almost instantaneous. The future of television viewing will most likely favor non-live, nonlinear viewing as opposed to live viewing at otherwise inconvenient times. It is therefore important that the VRA adjustment capability is able to work in conjunction with these replay devices. The adjustment hardware can be located as part of a remote control, a video screen GUI or physical hardware on the replay mechanism. The recording process simply needs to record all information as it has been transmitted, including the separate voice track. Then the playback and adjustment mechanisms will incorporate the same components as discussed in previous embodiments of the VRA and AutoVRA adjustment hardware.

Re-Production

Figure 26:
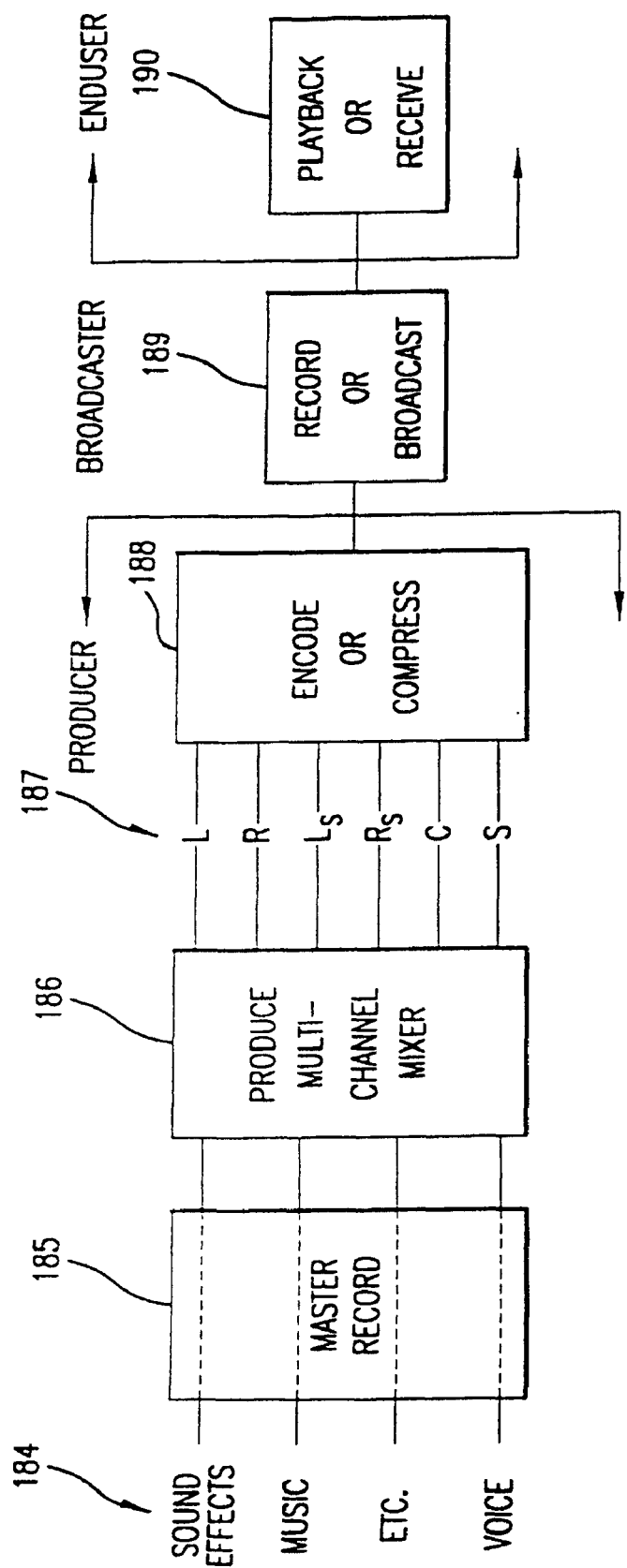
FIG. 26 illustrates a conventional reproduction processes.

Presently, the production of audio (for broadcasts, movies, music, etc.) can be considered as a multi-step procedure as described by FIG. 26 considered to be prior art. At the production level, there exists several types of sounds that will be recorded to form the entire audio program. These sounds 184 can be divided into several types that include sound effects, music, voice and other sounds. Typically, for understanding of the plot or lyrics of a program or audio, the voice segment of production level sounds is considered critical. All of these sounds are first recorded separately 185. Some sounds are not recorded via a microphone such as sound effects, which are often dubbed from prerecorded sets of effects tracks. It is not always necessary to record all sounds so that they are synchronized on the master. Nonlinear recording and playback allow the production 186 to line up sounds with video and with other sounds over the course of several playback/record cycles, often accomplished using software driving recording and editing. The production process 186 synchronizes all sounds with each other (and the video if present), mixes them with appropriate ratios, and applies them to the surround channel (if applicable) where the audio engineer feels they best belong 187. For example, actors that are talking on screen will often have their voice placed on the center channel closest to the screen location. In order to transmit or record large amounts of information, an encoding or compression process is often required 188. This is not always the case if analog recording and playback is used, but multi-channel digital playback will often have some sort of encoding (for copy protection), and/or compression (lossy or lossless) depending on the recording media or broadcast requirements. The encoded and/or compressed program is then recorded or broadcast 189 and played back or received 190 at the end user location. It is clear from the process in FIG. 26 that the end user cannot have any adjustment over the level of the dialog with respect to the remaining audio because the producer has complete control at 186. Once mixed, it is nearly impossible to extract the voice from the remaining audio and return it to its original recorded quality 184.

Figure 27:
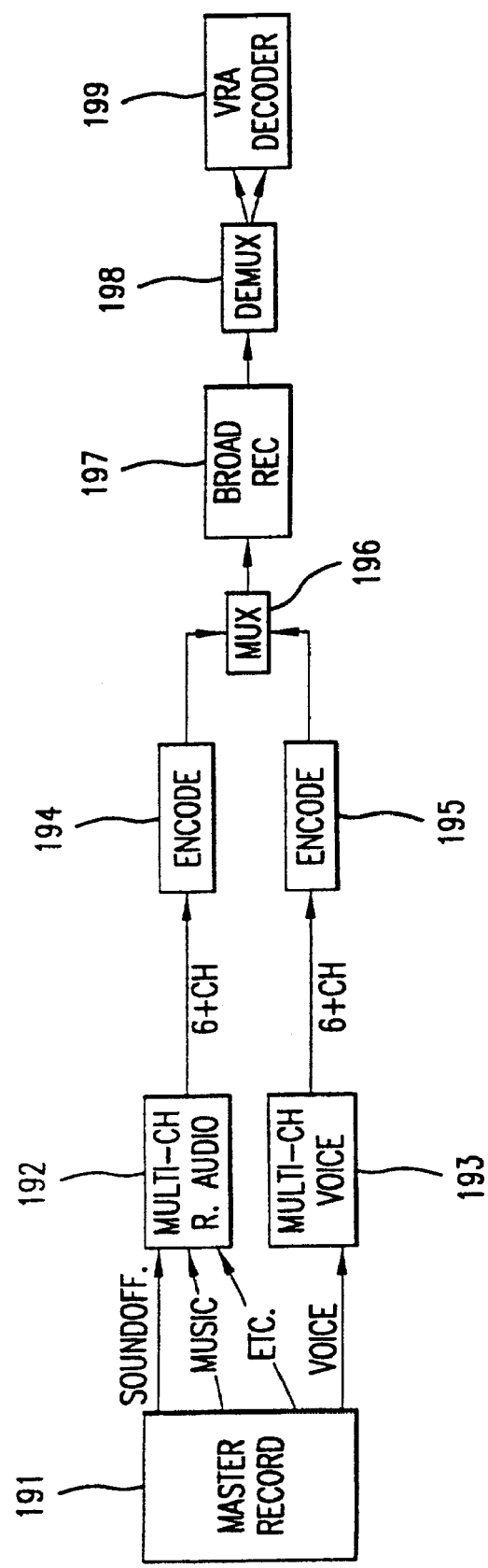
FIG. 27 illustrates an alternative embodiment of the present invention.

However, it is possible for producers to return to the master program 185 where all recorded elements are separate from each other, and obtain the voice and the remaining audio separately. This invention focuses on providing the means and ability to obtain the dialog and remaining audio and RE-record them separately so that the end user can have the ability to adjust the relative levels to suit his/her hearing needs. FIG. 27 shows one possible way to accomplish this goal. The master recording 191 of nearly all movies and multi-track audio programs exist as archived media, completely separate. In addition, information about the levels and locations of each of the tracks as produced in the original recording also exist along with those master recordings. This information is used in two separate multi-channel mixers 192 (for all remaining audio) and 193 (for voice only) to prepare two separate multi-channel programs that may be 6 channels as shown in 187 or more or fewer depending on the desired effects. Therefore the production information from the original recording process 186 is used to generate the same exact effects for the remaining audio and voice separately and simultaneously. Each of these multi-channel programs can thus be combined at the outputs of 192 and 193 to form the same total audio program 187 from the original mix, however they are completely separate. Each of these two multi-channel programs is then encoded and/or compressed as in 188 but using 194 and 195 completely separately. These two encoded channels can then be encoded further or multiplexed 196 to produce a single signal that is broadcast or recorded 197. Upon playback, this signal is decoded to form at least two multi-channel signals that can be VRA adjusted 199 using the hardware and embodiments discussed throughout the previous sections of this document.

Figure 28:
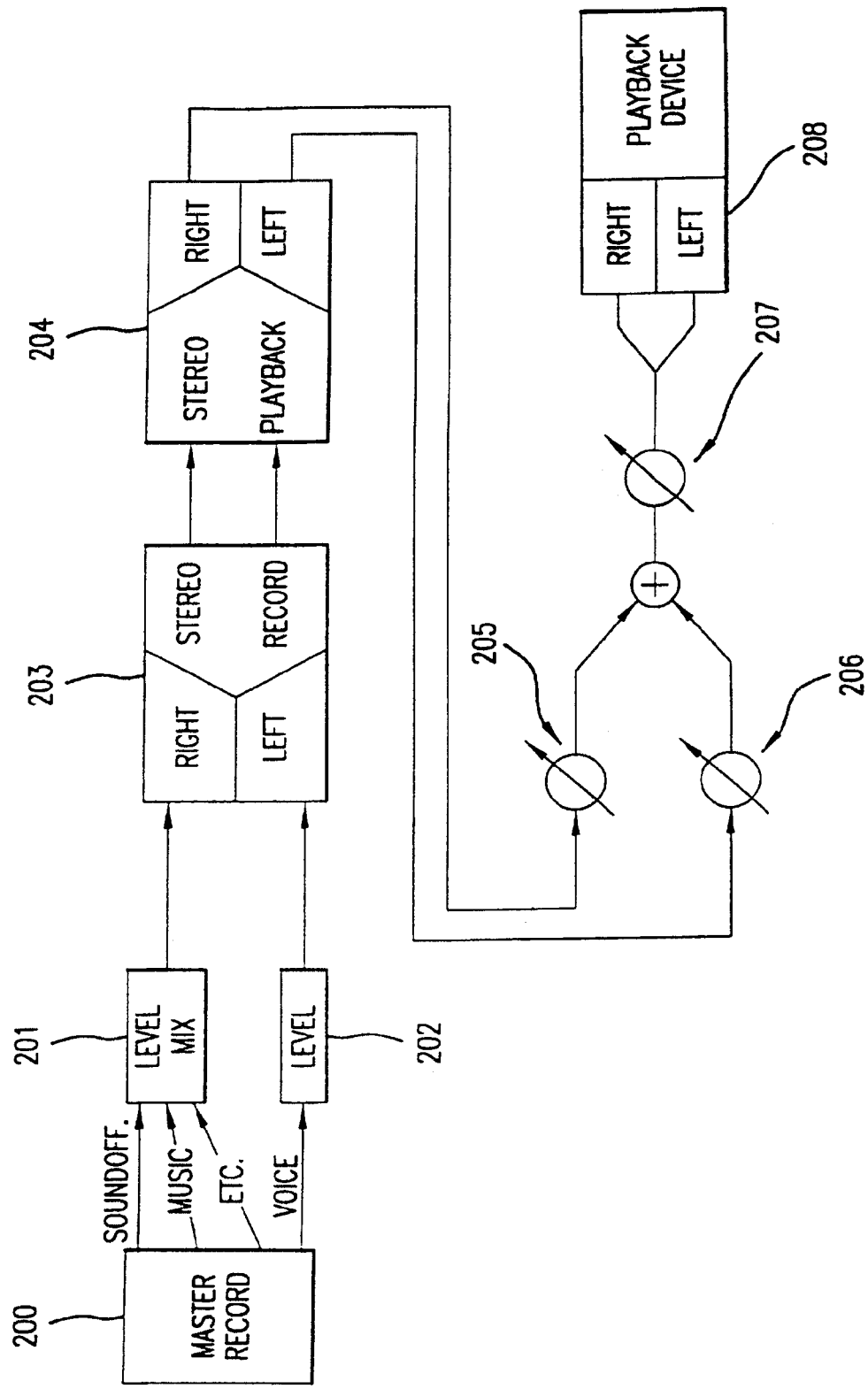
FIG. 28 illustrates an alternative embodiment of the present invention.

Remastering Multi-Channel Audio to a "VRA Friendly" Form, Remastering Stereo to a "VRA Friendly" Form FIG. 27 represents the most general method for transmitting the voice and remaining audio separately to the end user so that all spatial information for both the remaining audio and the voice is retained during playback. FIG. 28 illustrates the opposite end of this spectrum in that no spatial information is retained but the end user has the ability to adjust the voice to remaining audio levels independently. The master recording exists as in 185 and 191 as 200 in FIG. 28. All components that are considered as remaining audio (non-voice elements of the total audio recording) are mixed for level only by 201. This means that the relative contribution of one remaining audio component with respect to another remaining audio component is decided but no spatial locating is performed since the output of 201 is a single signal rather than a multi-channel signal. In addition, the voice level is adjusted 202 so that when combined without any adjustment, the level of the voice with respect to the remaining audio is exactly as the producer desires. The adjusted voice and adjusted remaining audio programs are then recorded onto a stereo media 203 which can include, for example, CD's, DVD's, analog tapes, etc but may also include broadcast audio in stereo. At this point a recorded or broadcast program in stereo exists where the voice and remaining audio are kept separate on the left and right or right and left tracks respectively. It is noted that some convention is needed to ensure that all products recognize that either the right or left channel contains the voice and the remaining audio is present on the other channel. This can be chosen based on a consensus from consumer electronics manufacturers and does not limit the scope of this invention to choose one over the other. The stereo playback device 204 will then provide two signals as outputs (left and right) one of which will have only voice and the other only remaining audio. To experience the whole program simultaneously with VRA adjustment, these two signals are passed through two variable gain amplifiers 205 and 206 where each of the levels are controlled, and then they are summed to form a total program. This total program can then be further adjusted for level 207. This fully adjusted total program is then split if it is to be reproduced 208 by a stereo playback system. The advantage of this configuration is that it is possible to accomplish the VRA media production and playback with today's consumer electronics and master recordings. Only a minimal amount of external hardware (205, 206, 207) is needed to enjoy VRA adjustment. The disadvantage is that the stereo image will be lost. However, many stereo effects are so subtle and playback systems are so lo-fidelity, that most consumers will much prefer the VRA adjustment instead of the stereo image.

The two embodiments discussed above in FIGS. 27 and 28 represent the most complex and most simple possibilities for providing VRA to the end user. Any embodiment with any number of recorded, produced, or playback channel can be envisioned from the descriptions in the above specification which is not limited to the two specific embodiments shown in FIGS. 27 and 28.

What is claimed is:

1. A personal listening device useful in a listening environment having a plurality of listeners, the personal listening device comprising:
    a receiver configured to receive a first audio signal and a second audio signal, the first audio signal including substantially a voice signal and the second audio signal including a remaining audio, the first audio signal being different than the second audio signal;
    an adjustment device configured to allow a listener to adjust the first audio signal and the second audio signal independent of each other; and
    a transducer configured to receive the adjusted first and/or second audio signals, combine the received first and second audio signals, and output an audible sound based on the combined first and second audio signals to the listener without interfering with other listeners in the listening environment.

2. The personal listening device of claim 1 wherein the personal listening device is chosen from a group consisting of a headphone, a hearing aid, an assisted listening device, a cochlear implant, an eyewear, a wearable computer, or a combination thereof.

3. The personal listening device of claim 1 wherein the receiver is chosen from a group consisting of Digital Theater Sound (DTS) receiver, Sony Dynamic Digital Sound (SDDS) receiver, Dolby Digital receiver, and other multi-channel format decoder.

4. The personal listening device of claim 1 wherein the second audio signal comprises a combination of left, right, left surround, right surround, center, and subwoofer analog outputs.

5. The personal listening device of claim 1 wherein the first audio signal and the second audio signal comprise digital signals that require decoding.

6. The personal listening device of claim 1 wherein the adjustment device is configured to adjust the second audio signal and a sum of the first audio signal and the adjusted second audio signal.

7. The personal listening device of claim 1 wherein the adjustment device is configured to adjust:
    a balance between the first and second audio signals, and
    a balanced combination of the first and second audio signals.

8. The personal listening device of claim 7 wherein the balance adjustment is based on a sum of:
    a ratio of actual and stored values of a first audio signal standard deviation, and
    a ratio of actual and stored values of a second audio signal standard deviation.

9. A broadcasting apparatus, comprising:
    a storage medium holding a first audio signal and a second audio signal corresponding to the first audio signal, the first audio signal including substantially a voice signal and the second audio signal including a remaining audio; and
    a transmitter configured to transmit the first and second audio signals to a plurality of receivers, wherein the first and/or second audio signals are configured to be independently adjusted at each of the plurality of receivers and subsequently combined to produce an audible sound.

10. The broadcasting apparatus of claim 9, further comprising a personal listening device chosen from a group consisting of a headphone, a hearing aid, an assisted listening device, a cochlear implant, an eyewear, a wearable computer, or a combination thereof.

11. The broadcasting apparatus of claim 9 wherein the receivers are chosen from a group consisting of Digital Theater Sound (DTS) receiver, Sony Dynamic Digital Sound (SDDS) receiver, Dolby Digital receiver, and other multi-channel format decoder.

12. The broadcasting apparatus of claim 9 wherein the second audio signal is a combination of left, right, left surround, right surround, center, and subwoofer analog outputs.

13. The broadcasting apparatus of claim 9 wherein the first audio signal and the second audio signal are digital signals that require decoding.

14. The broadcasting apparatus of claim 9 wherein the adjustment comprises adjusting the second audio signal and adjusting a sum of the first audio signal and the adjusted second audio signals.

15. The broadcasting apparatus of claim 9 wherein the independent adjustment comprises:
   adjusting a balance between the first and second audio signals, and
   adjusting a balanced combination of the first and second audio signal.

16. The broadcasting apparatus of claim 15 wherein the balance adjustment is based on a sum of:
   a ratio of actual and stored values of a first audio signal standard deviation, and
   a ratio of actual and stored values of a second audio signal standard deviation.

17. A personal listening device useful in a listening environment having a plurality of listeners, the personal listening device comprising:
   means for receiving a first audio signal and a second audio signal, the first audio signal including a voice signal and the second audio signal including a remaining audio, wherein the first audio signal is different than the second audio signal;
   means for adjusting the first audio signal and the second audio signal independent of each other by a listener; and
   means for receiving the adjusted first and/or second audio signals, combining the received first and second audio signals, and outputting an audible sound based on the combined first and second audio signals to the listener without interfering with other listeners in the listening environment.

* * * * *

UNITED STATES PATENT AND TRADEMARK OFFICE
CERTIFICATE OF CORRECTION

PATENT NO. : 8,170,884 B2
APPLICATION NO. : 11/971183
DATED : May 1, 2012
INVENTOR(S) : Vaudrey et al.

It is certified that error appears in the above-identified patent and that said Letters Patent is hereby corrected as shown below:

On the Face Page, under "Related U.S. Application Data", in Column 1, Line 1, delete field "(60)" and insert field -- (63) --, therefor.

On the Face Page, under "Related U.S. Application Data", in Column 1, Lines 7-10, delete "application No. 11/154,816 is a continuation-in-part of application No. 09/673,275, filed as application No. PCT/US99/08055 on Apr. 14, 1999, now Pat. No. 7,415,120," and insert -- application No. 11/154,816 is a continuation-in-part of application No. 09/673,275, filed Oct. 13, 2000, now Pat. No. 7,415,120, filed as application No. PCT/US99/08055, filed on Apr. 14, 1999, --, therefor.

On Page 2, in Field (56), under "OTHER PUBLICATIONS", in Column 2, Line 12, delete "rview" and insert -- review --, therefor.

In Fig. 11, Sheet 10 of 27, delete "R.A." and insert -- RA --, therefor.

Figure 14:
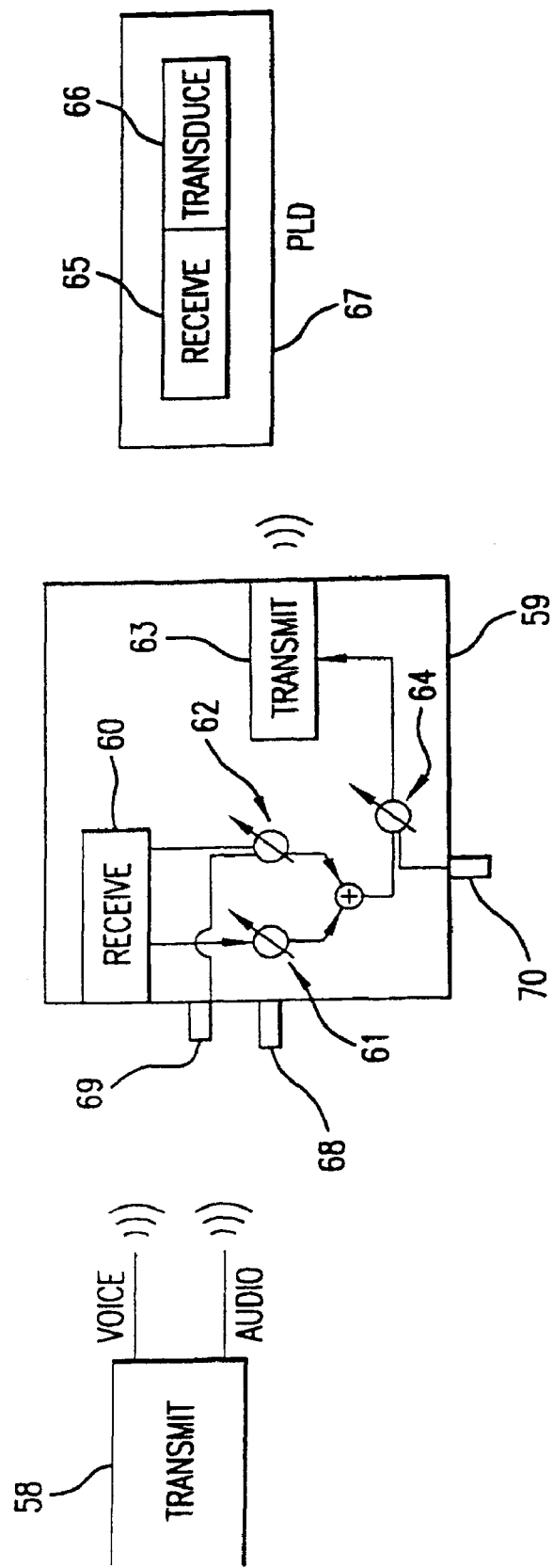
FIG. 14 illustrates an alternative embodiment of the present invention.

In Fig. 14, Sheet 13 of 27, for Tag "58" delete " " and insert -- --, therefor. 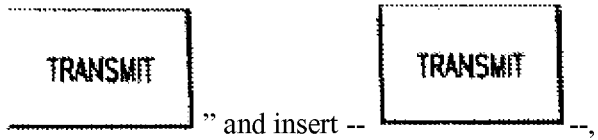

In Column 3, Line 54, delete "to and end" and insert -- to an end --, therefor.

In Column 7, Line 6, delete "1" and insert -- 301 --, therefor.

In Column 8, Line 32, delete "mult-port" and insert -- multi-port --, therefor.

In Column 14, Line 60, delete "capability" and insert -- capability. --, therefor.

Signed and Sealed this
Twenty-fifth Day of September, 2012

David J. Kappos
*Director of the United States Patent and Trademark Office*

CERTIFICATE OF CORRECTION (continued)
U.S. Pat. No. 8,170,884 B2

In Column 23, Line 8, delete "music" and insert -- music. --, therefor.

In Column 24, Line 13, delete "dialog" and insert -- dialog. --, therefor.